United States Patent
Miyamoto et al.

(10) Patent No.: US 12,330,238 B2
(45) Date of Patent: Jun. 17, 2025

(54) JOINT AMOUNT CONTROL DEVICE, JOINT AMOUNT CONTROL METHOD, JOINT AMOUNT CONTROL PROGRAM, AND LASER PROCESSING MACHINE

(71) Applicant: AMADA CO., LTD., Kanagawa (JP)

(72) Inventors: Haruo Miyamoto, Kanagawa (JP); Masahiro Gohongi, Kanagawa (JP); Naoyasu Narita, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 867 days.

(21) Appl. No.: 17/605,523

(22) PCT Filed: Apr. 24, 2020

(86) PCT No.: PCT/JP2020/017629
§ 371 (c)(1),
(2) Date: Oct. 21, 2021

(87) PCT Pub. No.: WO2020/218477
PCT Pub. Date: Oct. 29, 2020

(65) Prior Publication Data
US 2022/0212290 A1 Jul. 7, 2022

(30) Foreign Application Priority Data
Apr. 26, 2019 (JP) .................. 2019-085013

(51) Int. Cl.
*B23K 26/38* (2014.01)
*B23K 26/082* (2014.01)
(Continued)

(52) U.S. Cl.
CPC ............ *B23K 26/38* (2013.01); *B23K 26/082* (2015.10); *B23K 37/0408* (2013.01);
(Continued)

(58) Field of Classification Search
CPC ............ B23K 37/0408; B23K 2101/18; B23K 26/0884; G05B 19/40937; G05B 19/404
(Continued)

(56) References Cited

U.S. PATENT DOCUMENTS

| 4,739,489 A | 4/1988 | Kishi et al. |
| 5,204,599 A | 4/1993 | Hohn |
| 11,953,875 B2 * | 4/2024 | Nagayama ............. B23K 26/38 |

FOREIGN PATENT DOCUMENTS

| JP | 4-39706 A | 2/1992 | |
| JP | 04039706 A * | 2/1992 | ............. G05B 19/18 |

(Continued)

OTHER PUBLICATIONS

Extended European Search Report for corresponding EP Application No. 20794939.7, issued May 19, 2022.
(Continued)

*Primary Examiner* — Ibrahime A Abraham
*Assistant Examiner* — Daniel Ward Hatten
(74) *Attorney, Agent, or Firm* — Renner, Otto, Boisselle & Sklar, LLP

(57) ABSTRACT

A processing program analyzer analyzes a processing program and extracts first and second codes included in the processing program and indicating a joint-constituting pair of a first endpoint of a cutting path on a laser cutting start side and a second endpoint of a cutting path on a laser cutting end side. A joint information adder adds joint information indicating the position of at least one of the first code and the second code to the processing program. A joint compensation amount generator generates a joint compensation amount to be set for a joint to be increased or decreased in a joint amount. A transmitter transmits to an NC device the processing program to which the joint information has been added and the joint compensation amount
(Continued)

associated with information indicating the joint to be increased or decreased in the joint amount.

8 Claims, 29 Drawing Sheets

(51) Int. Cl.
    *B23K 37/04*     (2006.01)
    *B23K 101/18*     (2006.01)
    *G05B 19/4093*     (2006.01)

(52) U.S. Cl.
    CPC .... *B23K 2101/18* (2018.08); *G05B 19/40937* (2013.01); *G05B 2219/45041* (2013.01)

(58) Field of Classification Search
    USPC ......... 700/166, 180, 86, 182, 187, 173, 160, 700/186, 184
    See application file for complete search history.

(56) References Cited

FOREIGN PATENT DOCUMENTS

| JP | H06161528 | A | * | 11/1992 | ......... G05B 19/4097 |
|----|-----------|---|---|---------|------------------------|
| JP | 6-161528  | A |   | 6/1994  |                        |
| JP | 2012096262| A | * | 11/2010 | ............. B23K 26/00 |
| JP | 2013128972| A | * | 12/2011 | ............. B23K 26/00 |

OTHER PUBLICATIONS

International Search Report for corresponding Application No. PCT/JP2020/017629, mailed Jun. 9, 2020.

Written Opinion for corresponding Application No. PCT/JP2020/017629, mailed Jun. 9, 2020.

* cited by examiner

JOINT AMOUNT CONTROL DEVICE, JOINT AMOUNT CONTROL METHOD, JOINT AMOUNT CONTROL PROGRAM, AND LASER PROCESSING MACHINE

TECHNICAL FIELD

The present disclosure relates to a joint amount control device, a joint amount control method, a joint amount control program, and a laser processing machine.

BACKGROUND ART

At the time of cutting a sheet metal by a laser processing machine to produce a part having a predetermined shape, a joint connecting the part and a base material may be formed so that the part does not completely separate from the base material (see Patent Literature 1). The joint prevents the part from springing up or falling off after the cutting of the sheet metal.

CITATION LIST

Patent Literature

Patent Literature 1: Japanese Patent Application Laid-Open Publication No. 2013-128972

SUMMARY

A processing program for cutting the sheet metal is created by an automatic programming apparatus (computer-aided manufacturing (CAM) device). By setting a position and a joint amount of the joint, the automatic programming apparatus can create a processing program for cutting a part, to which the joint has been added, from the sheet metal. The joint amount is a distance of a portion at the end of the part where the sheet metal is not cut.

Even when the joint amount is appropriately set in the processing program, the joint amount may not be appropriate due to the actual processing conditions of the laser processing machine. Specifically, a joint supposed to be formed may not be formed, the joint amount may be so small that the part inadvertently moves away from the base material, and the joint amount may be so large that the joint is difficult to cut. For example, due to variation in the amount of heat input in the laser processing machine, the joint amount may become inappropriate. When a processing program created for a laser processing machine using a $CO_2$ laser oscillator is used in a laser processing machine using a fiber laser oscillator, the joint amount may become inappropriate.

Conventionally, in a case where the joint amount is not appropriate when the sheet metal is actually cut by the laser processing machine, it is necessary to re-create a processing program in order to correct the joint amount.

It is an object of one or more embodiments to provide a joint amount control device, a joint amount control method, a joint amount control program, and a laser processing machine capable of compensating a joint amount without re-creating a processing program.

According to a first aspect of one or more embodiments, there is provided a joint amount control device including: a processing program analyzer configured to analyze a processing program for cutting a sheet metal by a laser processing machine to produce a part and configured to extract a first code and a second code included in the processing program and indicating a joint-constituting pair of a first endpoint of a cutting path on a laser cutting start side and a second endpoint of a cutting path on a laser cutting end side; a joint information adder configured to add, to the processing program, joint information indicating a position of at least one of the first code and the second code extracted by the processing program analyzer; a joint compensation amount generator configured to generate a joint compensation amount to be set for a joint to be increased or decreased in a joint amount, among joints provided in the part produced based on the processing program; and a transmitter configured to transmit, to a numerical control (NC) device configured to control the laser processing machine, the processing program to which the joint information is added so that the NC device cuts the sheet metal so as to produce a part provided with the joint based on the processing program and increases or decreases the joint amount of the joint to be increased or decreased in the joint amount by the joint compensation amount, and the joint compensation amount associated with information indicating the joint to be increased or decreased in the joint amount.

According to a second aspect of one or more embodiments, there is provided a joint amount control method including, by computer equipment: analyzing processing program for cutting a sheet metal by a laser processing machine to produce a part to extract a first code and a second code included in the processing program and indicating a joint-constituting pair of a first endpoint of a cutting path on a laser cutting start side and a second endpoint of a cutting path on a laser cutting end side; adding joint information indicating a position of at least one of the extracted first code and second code to the processing program; transmitting, to an NC device, the processing program to which the joint information is added so that the NC device cuts the sheet metal by controlling the laser processing machine based on the processing program so as to produce a part provided with the joint; generating a joint compensation amount to be set for a joint to be increased or decreased in a joint amount, among joints provided in the part produced based on the processing program; and transmitting, to the NC device, the joint compensation amount associated with information indicating a joint to be increased or decreased in the joint amount so that the joint amount of the joint to be increased or decreased in the joint amount is increased or decreased by the joint compensation amount at a time of the laser processing machine producing the part.

According to a third aspect of one or more embodiments, there is provided a joint amount control program for causing computer equipment to execute: analyzing a processing program for cutting a sheet metal by a laser processing machine to produce a part and configured to extract a first code and a second code included in the processing program and indicating a joint-constituting pair of a first endpoint of a cutting path on a laser cutting start side and a second endpoint of a cutting path on a laser cutting end side; adding joint information indicating a position of at least one of the extracted first code and second code to the processing program; transmitting, to a numerical control (NC) device, the processing program to which the joint information is added so that the NC device cuts the sheet metal by controlling the laser processing machine based on the processing program so as to produce a part provided with the joint; generating a joint compensation amount to be set for a joint to be increased or decreased in a joint amount, among joints provided in the part produced based on the processing program; and transmitting, to the NC device, the joint compensation amount associated with information indicating a joint to be increased or decreased in the joint amount so that the joint amount of the joint to be increased or decreased in the joint amount is increased or decreased by the joint compensation amount at a time of the laser processing machine producing the part.

According to a fourth aspect of one or more embodiments, there is provided a laser processing machine including: a processing program reader configured to read a processing program to which joint information is added, the joint information indicating a position of at least one of a first code and a second code included in a processing program for cutting a sheet metal by a laser processing machine to produce a part, the codes indicating a joint-constituting pair of a first endpoint of a cutting path on a laser cutting start side and a second endpoint of a cutting path on a laser cutting end side; a joint compensation amount storage configured to store a joint compensation amount set associated with a joint to be increased or decreased in a joint amount among joints provided in the part produced based on the processing program; and an interpreter configured to increase or decrease the joint amount of the joint to be increased or decreased in the joint amount by the joint compensation amount stored by the joint compensation amount storage when the processing program read by the processing program reader is interpreted to determine a joint amount of a joint provided in the part.

According to the joint amount control device, the joint amount control method, the joint amount control program, and the laser processing machine of one or more embodiments, the joint amount can be compensated without re-creating the processing program.

DESCRIPTION OF EMBODIMENT

Hereinafter, a joint amount control device, a joint amount control method, a joint amount control program, and a laser processing machine according to one or more embodiments will be described with reference to the accompanying drawings.

First Configuration Example

Figure 1:
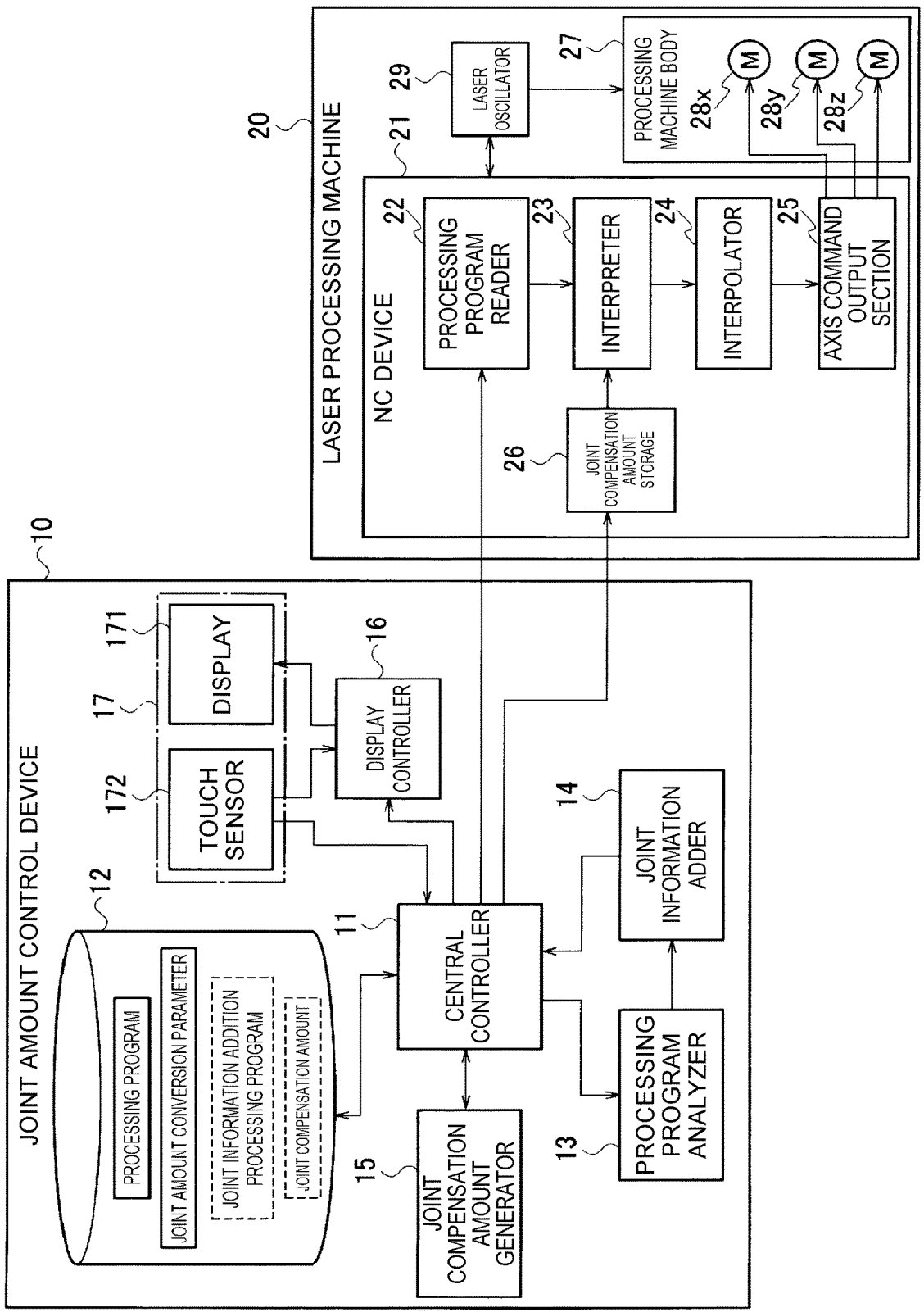
FIG. 1 is a block diagram showing a first configuration example of a joint amount control device and a laser processing machine according to one or more embodiments.

In FIG. 1, a joint amount control device 10 and a laser processing machine 20 are connected. The joint amount control device 10 includes a central controller 11, a storage 12, a processing program analyzer 13, a joint information adder 14, a joint compensation amount generator 15, a display controller 16, and a touch panel 17. The touch panel 17 includes a display 171, such as a liquid crystal panel, and a touch sensor 172 disposed on the display 171. The touch sensor 172 (touch panel 17) is an example of an operating section. The joint amount control device 10 may include an operating section other than the touch sensor 172.

Computer equipment can constitute the joint amount control device 10. The central controller 11 may be a central processing unit (CPU) of the computer equipment. The processing program analyzer 13, the joint information adder 14, the joint compensation amount generator 15, and the display controller 16 may be configured to be functioned by the CPU executing a joint amount control program, which is a computer program. The joint amount control program is stored in a non-transitory storage medium such as the storage 12 and loaded into a main memory, and the CPU executes each instruction described in the joint amount control program.

In the construction of the joint amount control device 10, the use of hardware and software is arbitrary.

A processing program created by an automatic programming apparatus is stored in the storage 12. The storage 12 stores joint amount conversion parameters to be described later. When a joint amount of a joint selected by the joint amount control device 10 is compensated, the joint compensation amount and a joint information addition processing program, created as described later, are stored into the storage 12.

It is not necessary that the processing program, the joint amount conversion parameter, the joint information addition processing program, and the joint compensation amount be all stored in one common storage. For example, the joint amount conversion parameter and the joint compensation amount may be stored in a storage except for the storage 12. The processing program may be stored in a processing program database connected to the joint amount control device 10 through a network, and the processing program read from the processing program database by the joint amount control device 10 may be stored into the storage 12. The storage for storing the joint compensation amount may be a transitory storage.

The central controller 11 reads out the processing program from the storage 12 and supplies the processing program to the processing program analyzer 13. The processing program analyzer 13 analyzes the processing program and extracts a position of a joint provided at the end of a part to be cut from a sheet metal.

Figure 2A:
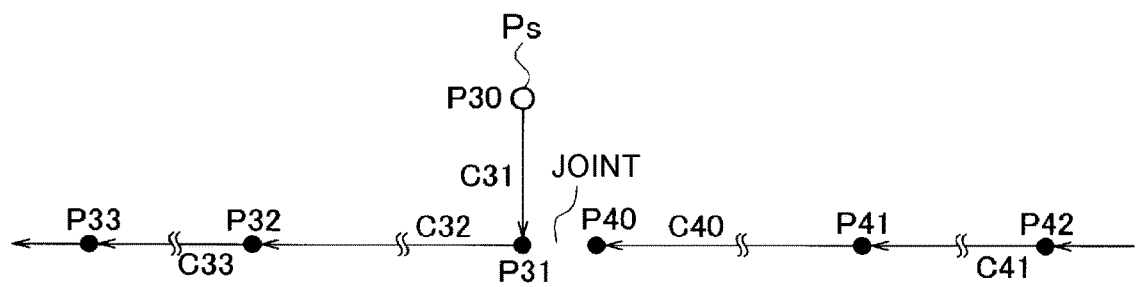
FIG. 2A is a view showing a first example of a joint forming method.
Figure 2B:
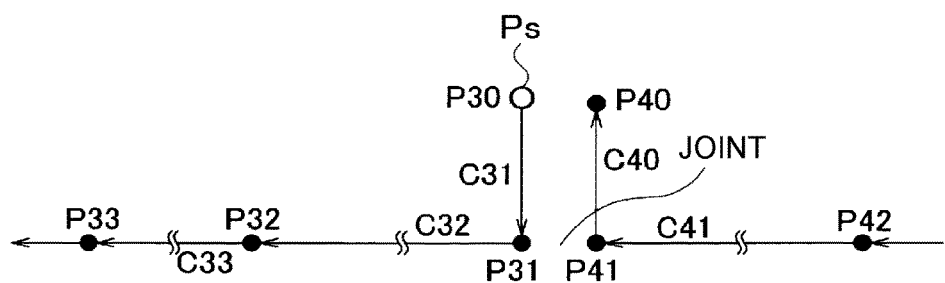
FIG. 2B is a view showing a second example of the joint forming method.
Figure 2C:
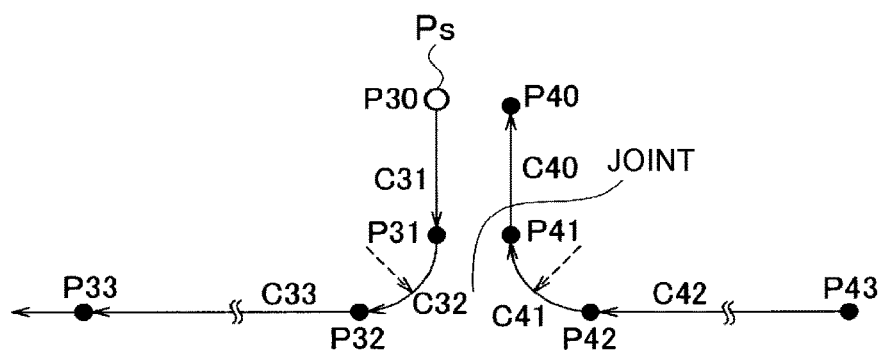
FIG. 2C is a view showing a third example of the joint forming method.

With reference to FIGS. 2A to 2C, how the joint is formed will be described. In the example shown in FIG. 2A, the laser processing machine 20 makes a pierced hole Ps at a laser cutting start point P30 set outside the part at the time of starting the cutting of the sheet metal and cuts a linear cutting path C31 to a point P31 located at the end of the part. Hereinafter, the laser cutting start point P30 will be abbreviated as a cutting start point P30. The cutting path C31 is referred to as an approach. The cutting start point P30 is an endpoint on the cutting start side of the cutting path C31, and the point P31 is an endpoint on the cutting end side of the cutting path C31.

The point P31 serves as a cutting start point at the time of cutting the sheet metal along the part, and the laser processing machine 20 cuts a cutting path C32 from the point P31 to a point P32. The point P31 is an endpoint on the cutting start side of the cutting path C32, and the point P32 is an endpoint on the cutting end side of the cutting path C32. The laser processing machine 20 cuts a cutting path C33 from the point P32 to a point P33 with the point P32 as the cutting start point. The point P32 is an endpoint on the cutting start side of the cutting path C33, and the point P33 is an endpoint on the cutting end side of the cutting path C33.

The points P31 to P33 are cutting start points of three cutting paths leading to the approach that is the first cutting path on the laser cutting start side.

The laser processing machine 20 cuts a cutting path C41 from a point P42 to a point P41 along the end of the part, cuts a cutting path C40 from the point P41 to a laser cutting end point P40, and ends the cutting of the sheet metal. The laser cutting end point P40 is a cutting end point of a series of cuts in which a plurality of cutting paths are connected and is at a position where irradiation with a laser beam is stopped and a processing head is raised. Hereinafter, the laser cutting end point P40 will be abbreviated as a cutting end point P40. The point P42 is an endpoint on the cutting start side of the cutting path C41, and the point P41 is an endpoint on the cutting end side of the cutting path C41. The point P41 is an endpoint on the cutting start side of the cutting path C40, and the cutting end point P40 is an endpoint on the cutting end side of the cutting path C40.

The points P41, P42 are cutting end points of two cutting paths on the side opposite to the cutting advancing direction leading to the last cutting path on the laser cutting end side.

At this time, a space between the point P31 (first endpoint), which is a cutting start point of the cutting path C32 on the laser cutting start side, and the cutting end point P40 (second endpoint) is a joint, and a distance therebetween is a joint amount.

In the example shown in FIG. 2B, the method of cutting on the laser cutting start side is the same as that in FIG. 2A, and the method of cutting on the laser cutting end side is different. The laser processing machine 20 cuts the cutting path C41 from the point P42 to the point P41 along the end of the part. Subsequently, the laser processing machine 20 cuts the linear cutting path C40 from the point P41 to the cutting end point P40 set outside the part. The cutting path C40 is referred to as an escape. The points P41, P42 are cutting end points of two cutting paths on the side opposite to the cutting advancing direction leading to the escape that is the last cutting path on the laser cutting end side.

At this time, a space between the point P31 (first endpoint), which is the cutting start point of the cutting path C32 on the laser cutting start side, and the point P41 (second endpoint), which is the cutting end point of the cutting path C41 on the laser cutting end side, is a joint, and a distance therebetween is a joint amount.

In the example shown in FIG. 2C, the laser processing machine 20 makes a pierced hole Ps at a cutting start point P30 and cuts a cutting path C31 that is a linear approach to a point P31. Subsequently, the laser processing machine 20 cuts a cutting path C32, which is a circular-arc-shaped approach, from the point P31 to a point P32 located at the end of the part with the point P31 as the cutting start point. The cutting path C32 is a minute circular arc having a radius of 0.5 mm or less. Further, the laser processing machine 20 cuts a cutting path C33 from the point P32 to a point P33 with the point P32 as the cutting start point.

The cutting start point P30 is an endpoint on the cutting start side of the cutting path C31, and the point P31 is an endpoint on the cutting end side of the cutting path C31. The point P31 is an endpoint on the cutting start side of the cutting path C32, and the point P32 is an endpoint on the cutting end side of the cutting path C32. The point P32 is an endpoint on the cutting start side of the cutting path C33, and the point P33 is an endpoint on the cutting end side of the cutting path C33.

The points P31 to P33 are cutting start points of three cutting paths leading to the approach from the laser cutting start point.

The laser processing machine 20 cuts a cutting path C42 from a point P43 to a point P42 along the end of the part. Subsequently, the laser processing machine 20 cuts a cutting path C41, which is a circular-arc-shaped escape from the point P42 to a point P41, with the point P42 as the cutting start point. The cutting path C41 is a minute circular arc having a radius of 0.5 mm or less. Further, the laser processing machine 20 cuts a cutting path C40, which is a linear escape from the point P41 to the cutting end point P40 with the point P41, as the cutting start point and ends the cutting of the sheet metal.

The point P43 is an endpoint on the cutting start side of the cutting path C42, and the point P42 is an endpoint on the cutting end side of the cutting path C42. The point P42 is an endpoint on the cutting start side of the cutting path C41, and the point P41 is an endpoint on the cutting end side of the cutting path C41. The point P41 is an endpoint on the cutting start side of the cutting path C40, and the cutting end point P40 is an endpoint on the cutting end side of the cutting path C40.

The points P41, P42 are cutting end points of two cutting paths on the side opposite to the cutting advancing direction leading to the escape that is the last cutting path on the laser cutting end side. In the case of FIG. 2C, the cutting path C41 is a cutting path of a first escape on the laser cutting end side, and the point P42 is the cutting end point of the cutting path C42 on the side opposite to the cutting advancing direction leading to the cutting path C41 of the first escape.

At this time, a space between the point P32 (first endpoint), which is the cutting start point of the cutting path C33 on the laser cutting start side, and the point P42 (second endpoint), which is the cutting end point of the cutting path C42 on the laser cutting end side, becomes a joint. When the circular-arc-shaped cutting paths C32, C41 are provided for the approach and the escape as shown in FIG. 2C, respectively, the sheet metal is not cut between the point P32 and the point P42 at the time of removing the part from the sheet metal, but is cut at a position away outward from the end of the part. Therefore, the distance between the point P31 and the point P41 is the joint amount instead of the distance between the point P32 and the point P42.

As described above, the joint may be formed as shown in FIG. 2C other than FIG. 2A or FIG. 2B. Therefore, in order to extract the positions of the joints corresponding to all the joints shown in FIGS. 2A to 2C, it is necessary to select, on the laser cutting start side, the first endpoint from three points (P31 to P33) that are the cutting start points of the three cutting paths leading to the approach from the cutting start point P30 at which the pierced hole Ps is made.

In order to extract the positions of the joints corresponding to all the joints shown in FIGS. 2A to 2C, it is necessary to select, on the laser cutting end side, the second endpoint from three points of the cutting end point P40 and the cutting end points (P41, P42) of the two cutting paths in the direction opposite to the cutting advancing direction leading to the last cutting path toward the cutting end point P40.

When the joint provided in the part is one of the joints shown in FIG. 2A or FIG. 2B, and the joint shown in FIG. 2C is not used, it is not necessary to select the first endpoint from the three cutting start points on the laser cutting start side and to select the second endpoint from the three cutting end points on the laser cutting end side. The first endpoint may be selected from the cutting start point of at least one cutting path leading to the approach from the laser cutting start point at which the pierced hole is made, and the second endpoint may be selected from the laser cutting end point and the cutting end point of at least one cutting path leading to the cutting path toward the laser cutting end point in the direction opposite to the cutting advancing direction.

Figure 8A:
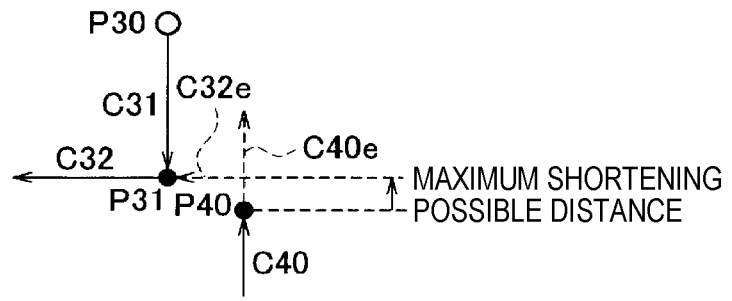
FIG. 8A is a view showing the maximum shortening possible distance of a joint in a fourth example of the joint forming method.
Figure 8B:
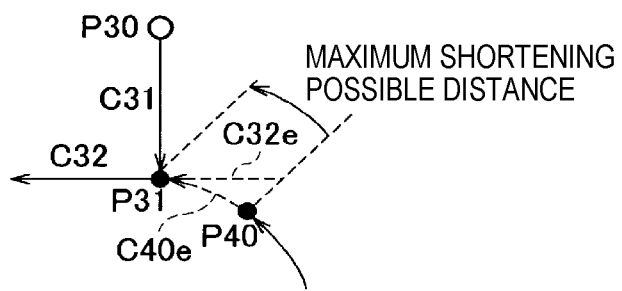
FIG. 8B is a view showing the maximum shortening possible distance of a joint in a fifth example of the joint forming method.
Figure 8C:
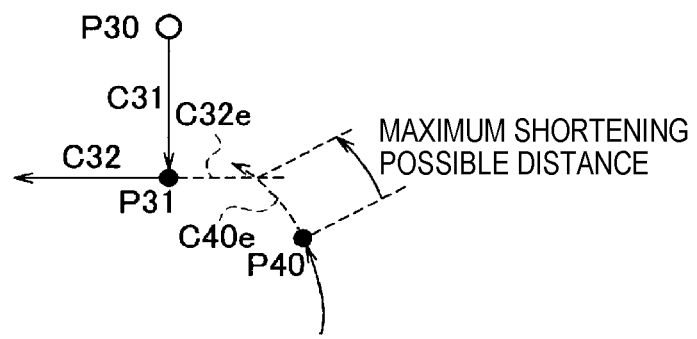
FIG. 8C is a view showing the maximum shortening possible distance of a joint in a sixth example of the joint forming method.

In one or more embodiments, in consideration of a case where the joint of FIG. 2C is used, a case will be described in which the first endpoint is selected from the three cutting start points on the laser cutting start side and the second endpoint is selected from the three cutting end points on the laser cutting end side. Note that FIGS. 2A to 2C are examples of a joint forming method, and other forming methods exist as shown in FIGS. 8A to 8C, which will be described later.

Figure 3:
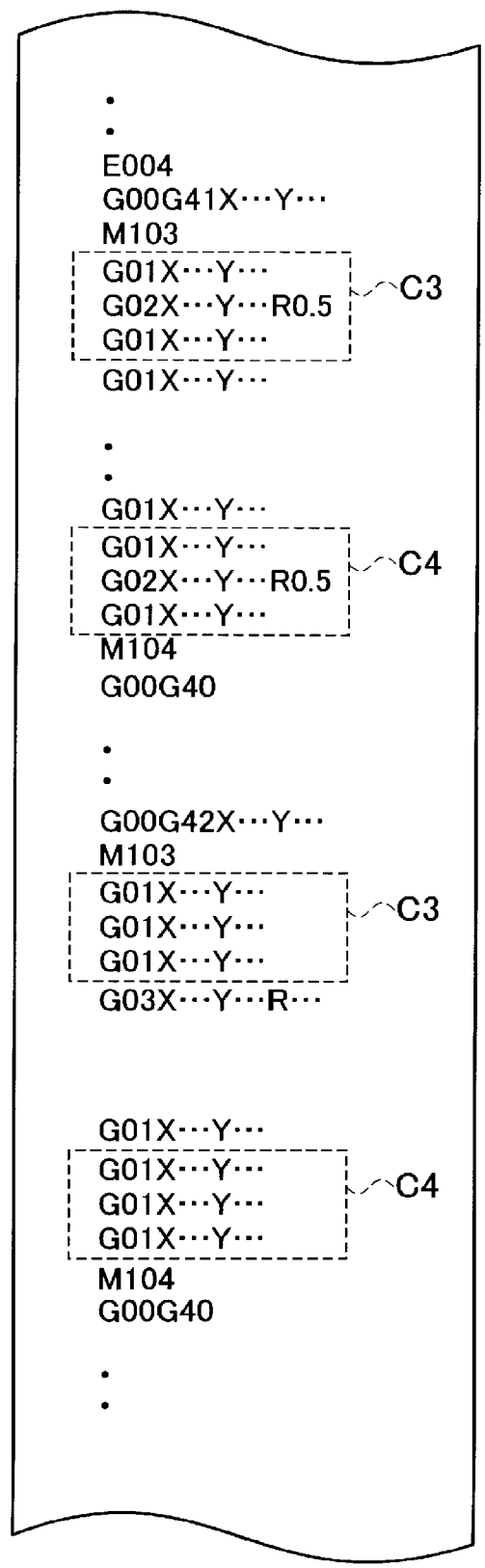
FIG. 3 is a simplified diagram showing an example of a processing program.

FIG. 3 shows a simplified example of a processing program configured using G-codes. In FIG. 3, M103 is a code indicating the start of cutting, and M104 is a code indicating the end of cutting. A code beginning with G immediately before the code M103 indicates the position of the pierced hole. That is, codes beginning with G following the code M103 may indicate the respective cutting end points of the three cutting paths C31 to C33 for forming the joint. Codes beginning with G immediately before the code M104 may indicate the cutting end point P40 for forming the joint and the cutting start points of the two cutting paths C40, C41 that go back from the cutting end point P40 in the direction opposite to the cutting advancing direction.

Thus, as shown in FIG. 3, the processing program analyzer 13 extracts all of cutting commands C3 for three lines (three paths) following the code M103 and cutting commands C4 for three lines (three paths) immediately before the code M104. As an example, it is assumed that the processing program has five cutting commands C3 and five cutting commands C4.

Figure 4:
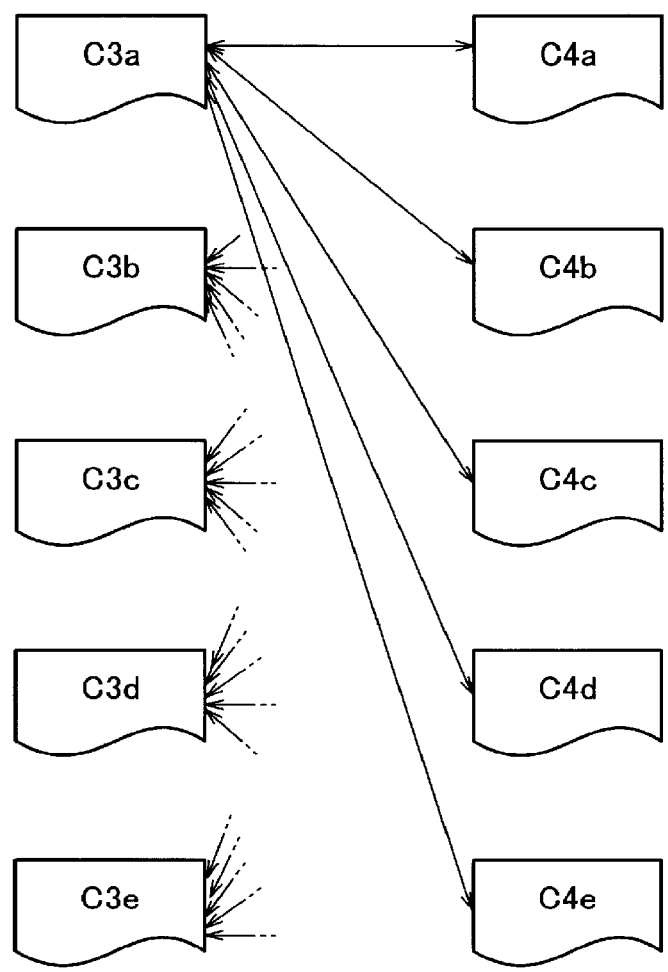
FIG. 4 is a view conceptually showing cutting commands on a laser cutting start side and cutting commands on a laser cutting end side extracted from a processing program.

As shown in FIG. 4, the five cutting commands C3 are defined as C3a to C3e, and the five cutting commands C4 are defined as C4a to C4e. For extracting the position of the joint, the processing program analyzer 13 determines whether or not a pair of the cutting command C3 and the cutting command C4 includes a cutting path for forming the joint in all combinations of the cutting commands C3a to C3e and the cutting commands C4a to C4e.

Figure 5:
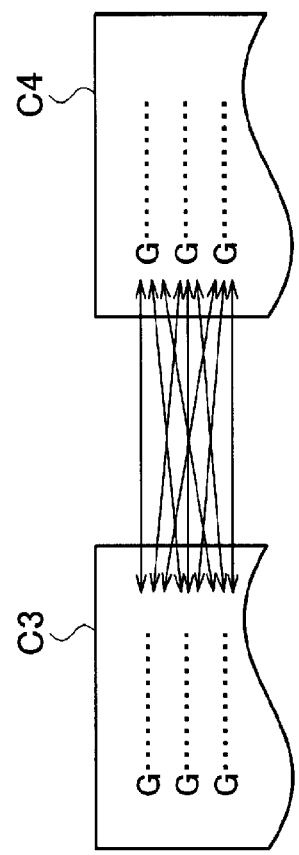
FIG. 5 is a view showing all combinations of three cutting start points included in the cutting command on the laser cutting start side and three cutting end points included in the cutting command on the laser cutting end side.

As shown in FIG. 5, the processing program analyzer 13 calculates the distances of all combinations of three cutting start points included in the cutting command C3 on the laser cutting start side and three cutting end points included in the cutting command C4 on the laser cutting end side in all the combinations of the cutting commands C3a to C3e and the cutting commands C4a to C4e. In FIGS. 2A to 2C, the processing program analyzer 13 calculates the distances between the three points P31 to P33 on the laser cutting start side and the three points of the cutting end points P40 to P42 on the laser cutting end side.

When the calculated distance is within a range of a predetermined distance, the processing program analyzer 13 takes a pair of the cutting start point on the laser cutting start side and the cutting end point on the laser cutting end side as a candidate of the pair constituting the joint. The range of the predetermined distance is, for example, 0.3 mm to 1.0 mm. In FIG. 2A, when the distance between the point P31 and the cutting end point P40 is within the range of 0.3 mm to 1.0 mm, the pair of the point P31 and the cutting end point P40 is a candidate (hereinafter referred to as a joint candidate) for the pair of the first and second endpoints constituting the joint.

In FIG. 2B, the pair of the point P31 and the point P41 is a joint candidate. The cutting path C40 of the escape is longer than 1.0 mm, and the pair of the point P31 and the cutting end point P40 is not a joint candidate. In FIG. 2C, the pair of the point P31 and the point P41, the pair of the point P31 and the point P42, the pair of the point P32 and the point P41, and the pair of the point P32 and the point P42 are joint candidates.

Figure 6:
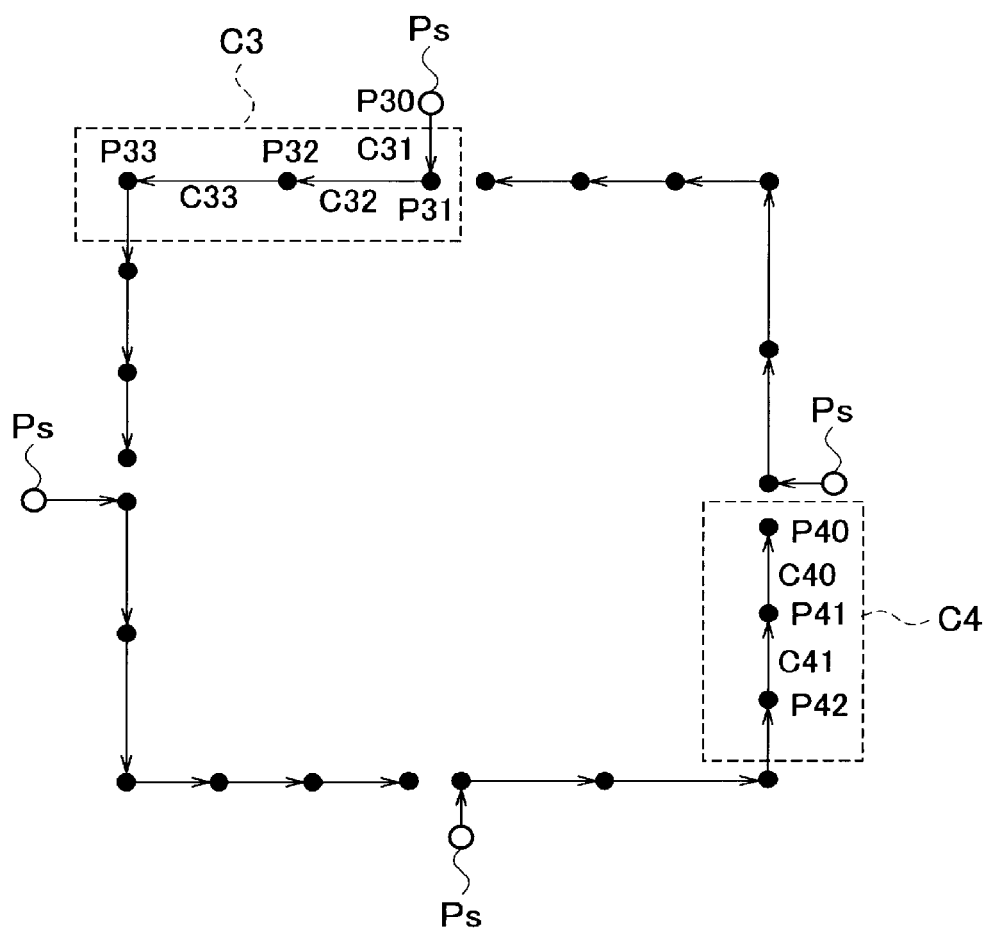
FIG. 6 is a view showing an example of a pair of a cutting command on the laser cutting start side and a cutting command on the laser cutting end side, the pair not constituting a joint.

It is assumed that the processing program is configured to cut the sheet metal into a rectangular shape as shown in FIG. 6 and that a pair of the cutting command C3 and the cutting command C4 is selected as shown in FIG. 6. In such a case, regardless of any combination of the three points P31 to P33 and the three points P40, P41, P42, the distance between the two points does not fall within the range of 0.3 mm to 1.0 mm. Therefore, in the pair of the cutting command C3 and the cutting command C4 selected as shown in FIG. 6, the joint candidate is not extracted.

The processing program analyzer 13 extracts the pair constituting the joint by excluding, as follows, a pair not constituting the joint from the joint candidates extracted using the distance between the first endpoint on the laser cutting start side and the second endpoint on the laser cutting end side as a determination reference as described above.

The processing program analyzer 13 extends the cutting path from the first endpoint of the joint candidate in the direction opposite to the cutting advancing direction and extends the cutting path toward the second endpoint of the joint candidate in the cutting advancing direction. When the extended line of the cutting path toward the second endpoint collides with the first endpoint, the processing program analyzer 13 determines that the joint candidate is the pair constituting the joint. When the extended line in the direction opposite to the cutting advancing direction of the cutting path from the first endpoint and the extended line in the cutting advancing direction of the cutting path toward the second endpoint intersect with each other, the processing program analyzer 13 determines that the joint candidate is the pair constituting the joint.

Figure 7A:
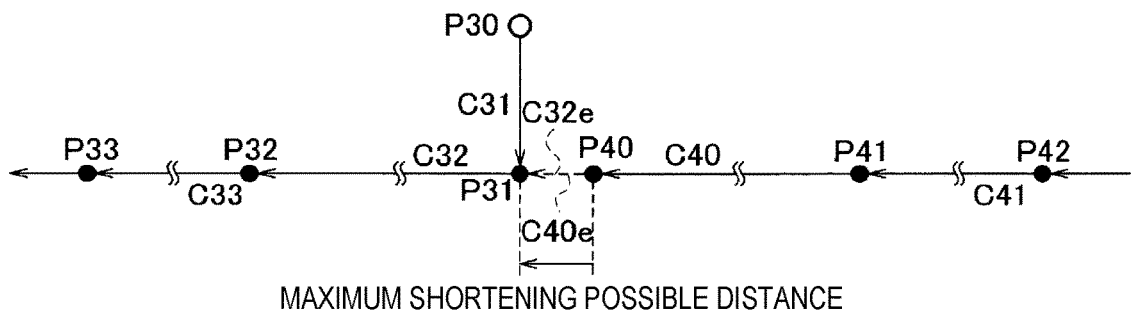
FIG. 7A is a view showing the maximum shortening possible distance of the joint in the first example of the joint forming method shown in FIG. 2A.
Figure 7B:
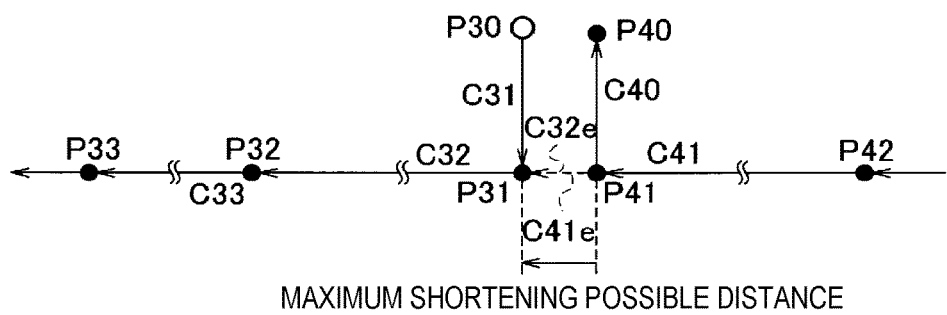
FIG. 7B is a view showing the maximum shortening possible distance of the joint in the second example of the joint forming method shown in FIG. 2B.
Figure 7C:
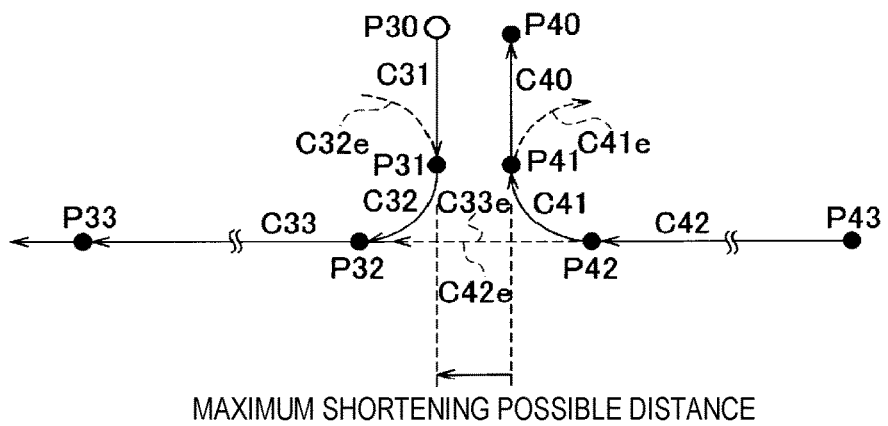
FIG. 7C is a view showing the maximum shortening possible distance of the joint in the third example of the joint forming method shown in FIG. 2C.

With reference to FIGS. 7A to 7C, a description will be given of how the pair not constituting the joint is excluded and the pair constituting the joint is extracted in the cases of FIGS. 2A to 2C. In FIG. 7A, the extended line in the direction opposite to the cutting path C32 from the point P31, which is the joint candidate, is linear C32e, and the extended line in the cutting advancing direction of the cutting path C40 toward the cutting end point P40 is linear C40e. Since the extended line C40e collides with the point P31, it is determined that the pair of the point P31 and the cutting end point P40 constitutes the joint.

In a case where the cutting end point P40 is made close to the point P31 to decrease the joint amount, in principle, the distance between the point P31 and the cutting end point P40 is the maximum shortening possible distance of the joint amount. When the cutting end point P40 is moved away from the start point P31 to increase the joint amount, the cutting end point P40 can be moved to the point P41 that is the cutting end point of the cutting path C41, so that, in principle, the distance between the cutting end point P40 and the point P41 is the maximum extension possible distance of the joint amount. However, in one or more embodiments, the maximum distance for shortening or extending the joint amount is set to 0.5 mm.

Similarly, in FIG. 7B, it is determined that the pair of the point P31 and the point P41 constitutes the joint. The distance between the point P31 and the point P41 is in principle the maximum shortening possible distance of the joint amount, and the distance between the point P41 and the point P42 is in principle the maximum extension possible distance of the joint amount.

In FIG. 7C, the extended line from the point P31, which is the joint candidate, in the direction opposite to the cutting advancing direction of the cutting path C32 is circular-arc-shaped C32e, and the extended line from the point P32, which is the joint candidate, in the direction opposite to the cutting advancing direction of the cutting path C33 is linear C33e. The extended line of the cutting path C41 toward the point P41, which is the joint candidate, in the cutting advancing direction is C41e, and the extended line of the cutting path C42 toward the joint candidate point P42 in the cutting advancing direction is C42e. Since the extended line C42e collides with the point P32, it is determined that the pair of the point P32 and the point P42 constitutes the joint.

When the joint formed at the end of the part is a special joint having a circular-arc-shaped approach and escape as shown in FIG. 7C, the distance between the point P32 and the point P42 is not the maximum shortening possible distance of the joint amount. The distance between the point P31 and the point P41 is in principle the maximum shortening possible distance of the joint amount. The distance between the point P42 and the point P43 is in principle the maximum extension possible distance of the joint amount.

In the example shown in FIG. 8A, an extended line C32e extended from the point P31 in the direction opposite to the cutting advancing direction of the cutting path C32 intersects with an extended line C40e extended in the cutting advancing direction of the cutting path C40 toward the cutting end point P40, and it is determined that the pair of the point P31 and the cutting end point P40 is the pair constituting the joint. The distance from the cutting end point P40 to the extended line C32e is in principle the maximum shortening possible distance of the joint amount.

In the example shown in FIG. 8B, a circular-arc-shaped extended line C40e of the cutting path C40 toward the cutting end point P40 in the cutting advancing direction collides with the point P31, and it is determined that the pair of the point P31 and the cutting end point P40 is the pair constituting the joint. The distance along the extended line C40e from the cutting end point P40 to the point P31 is in principle the maximum shortening possible distance of the joint amount.

In the example shown in FIG. 8C, an extended line C32e extended from the point P31 in the direction opposite to the cutting advancing direction of the cutting path C32 and a circular-arc-shaped extended line C40e extended in the cutting advancing direction of the cutting path C40 toward the cutting end point P40 intersect with each other, and it is determined that the pair of the point P31 and the cutting end point P40 is the pair constituting the joint. The distance along the extended line C40e from the cutting end point P40 to the extended line C32e is in principle the maximum shortening possible distance of the joint amount.

Figure 9:
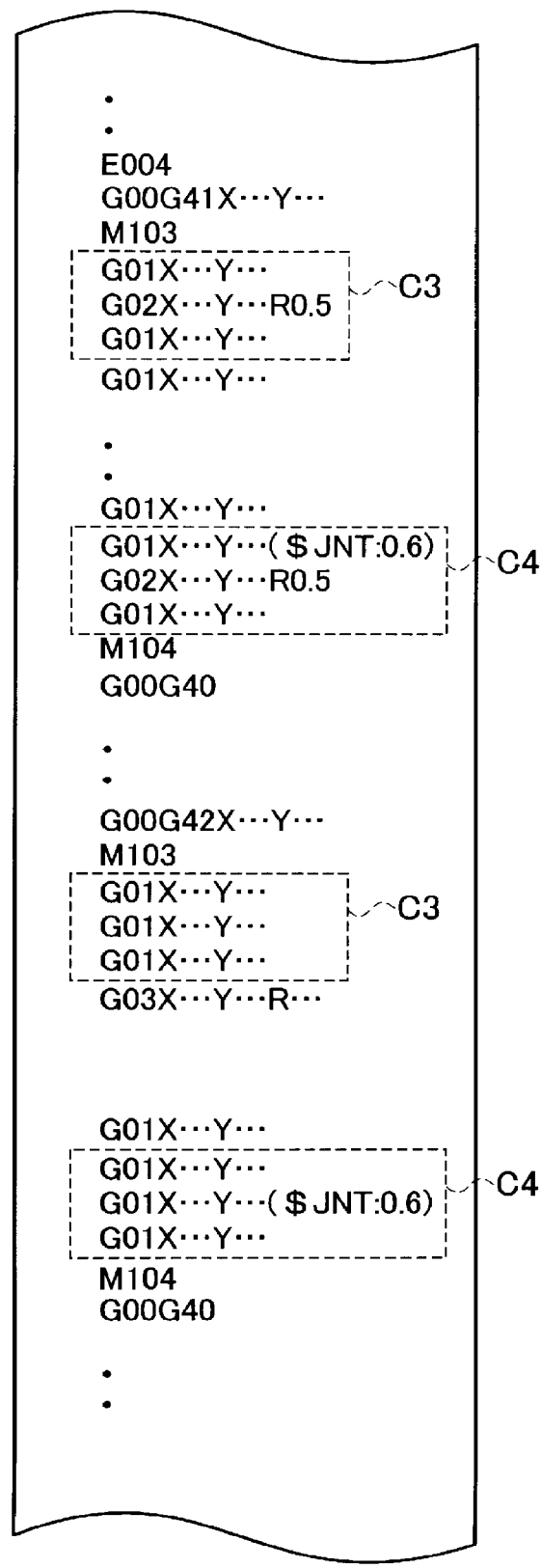
FIG. 9 is a simplified view showing an example of a processing program to which joint information has been added.

Returning to FIG. 1, the processing program analyzer 13 analyzes the entire processing program to extract the position of the joint and then supplies the processing program and the position information of the joint to the joint information adder 14. As shown in FIG. 9, the joint information adder 14 adds joint information indicating the position of the joint to the processing program. Specifically, the joint information adder 14 adds, as an example, a symbol "$JNT" to a code (second code) indicating the second endpoint on the laser cutting end side in the pair of the first endpoint and the second endpoint constituting the joint.

In one or more embodiments, as a preferred configuration, the joint information adder 14 adds the maximum value enabling the joint amount to be decreased to a maximal degree, in addition to "$JNT," to the code indicating the second endpoint. The maximum value indicates the maximum shortening possible distance obtained as described above. In the example shown in FIG. 9, the maximum shortening possible distance is 0.6 mm, and a symbol "$JNT: 0.6" is added to the code indicating the second endpoint.

Instead of adding the symbol "$JNT" as the joint information to the processing program, the joint information adder 14 may add an address represented by, for example, L, which can be directly read by the NC device 21 to be described later, as the joint information to the processing program. A G-code system may be customized to set joint information by an arbitrary method, and a G-code in the customized G-code system may be read to interpret the joint information.

The joint information adder 14 is not limited to adding the joint information to the code of the processing program, but the joint information may be configured in a file different from the processing program, and the joint information adder 14 may add a different file including the joint information to the processing program. The joint information adder 14 may only add the joint information to the processing program in an arbitrary form. Associating the processing program with the joint information is included in adding the joint information to the processing program.

Instead of the joint information adder 14 adding joint information, the joint information may be added to the processing program at the point in time when the processing program is created by the automatic programming apparatus.

The joint information is added to the code indicating the second endpoint on the laser cutting end side in the pair of the first endpoint and the second endpoint in order to change the position of the second endpoint and compensate the joint amount. As will be described later, the joint information may be added to a code (first code) indicating the first endpoint on the laser cutting start side to change the position of the first endpoint and compensate the joint amount. The joint information may be added to both the code indicating the first endpoint and the code indicating the second endpoint to change the positions of both the first and second endpoints and compensate the joint amount.

The central controller 11 causes the storage 12 to store a processing program (joint information addition processing program) to which the joint information generated by the joint information adder 14 has been added. The central controller 11 may control the storage 12 so as to overwrite the joint information addition processing program on the processing program before the addition of the joint information. The central controller 11 transmits the joint information addition processing program stored in the storage 12 to the laser processing machine 20. The central controller 11 functions as a transmitter that transmits the joint information addition processing program to the laser processing machine 20 (NC device 21).

As shown in FIG. 1, the laser processing machine includes a processing machine body 27, a laser oscillator 29, and the NC device 21 that controls the processing machine body 27 and the laser oscillator 29. The NC device 21 includes a processing program reader 22, an interpreter 23, an interpolator 24, an axis command output section 25, and a joint compensation amount storage 26. The laser oscillator 29 is, for example, a fiber laser oscillator.

The processing machine body 27 includes the processing head that irradiates the sheet metal with a laser beam emitted from the laser oscillator. The processing machine body 27 includes motors 28x, 28y, 28z for moving the processing head in the X-axis, Y-axis, and Z-axis directions. The X axis and the Y axis are one direction and the other direction orthogonal to each other along the surface of the sheet metal, and the Z axis is a direction orthogonal to the surface of the sheet metal. Motors 28x, 28y, 28z have encoders.

The processing program reader 22 reads and stores the joint information addition processing program transmitted from the joint amount control device 10. The interpreter 23 interprets the joint information addition processing program supplied from the processing program reader 22. As will be described later, the interpreter 23 may read the joint compensation amount stored in the joint compensation amount storage 26.

As described above, the processing program includes codes for designating the cutting start point and the cutting end point of each cutting path at the time of cutting the sheet metal by a laser beam. The interpolator 24 interpolates a point between the cutting start point and the cutting end point of each cutting path. Based on the output by the interpolator 24, the axis command output section 25 outputs axis commands for moving the processing head in the X-axis, Y-axis, and Z-axis directions to the motors 28x, 28y, 28z, respectively. The laser processing machine 20 cuts the sheet metal to produce a part having a predetermined shape in accordance with the configuration and operation described above.

Suppose that an operator found that a joint amount of a joint at any position in the sheet metal is not appropriate during or after the cutting of the sheet metal by the laser processing machine 20. The operator operates the touch panel 17 or another operating section to instruct the touch panel 17 to display sheet cutting data including a joint mark that indicates the position of the joint. When instructed to display the sheet cutting data, the display controller 16 controls the touch panel 17 so as to display the sheet cutting data including the joint mark based on the joint information addition processing program stored in the storage 12.

Figure 10:
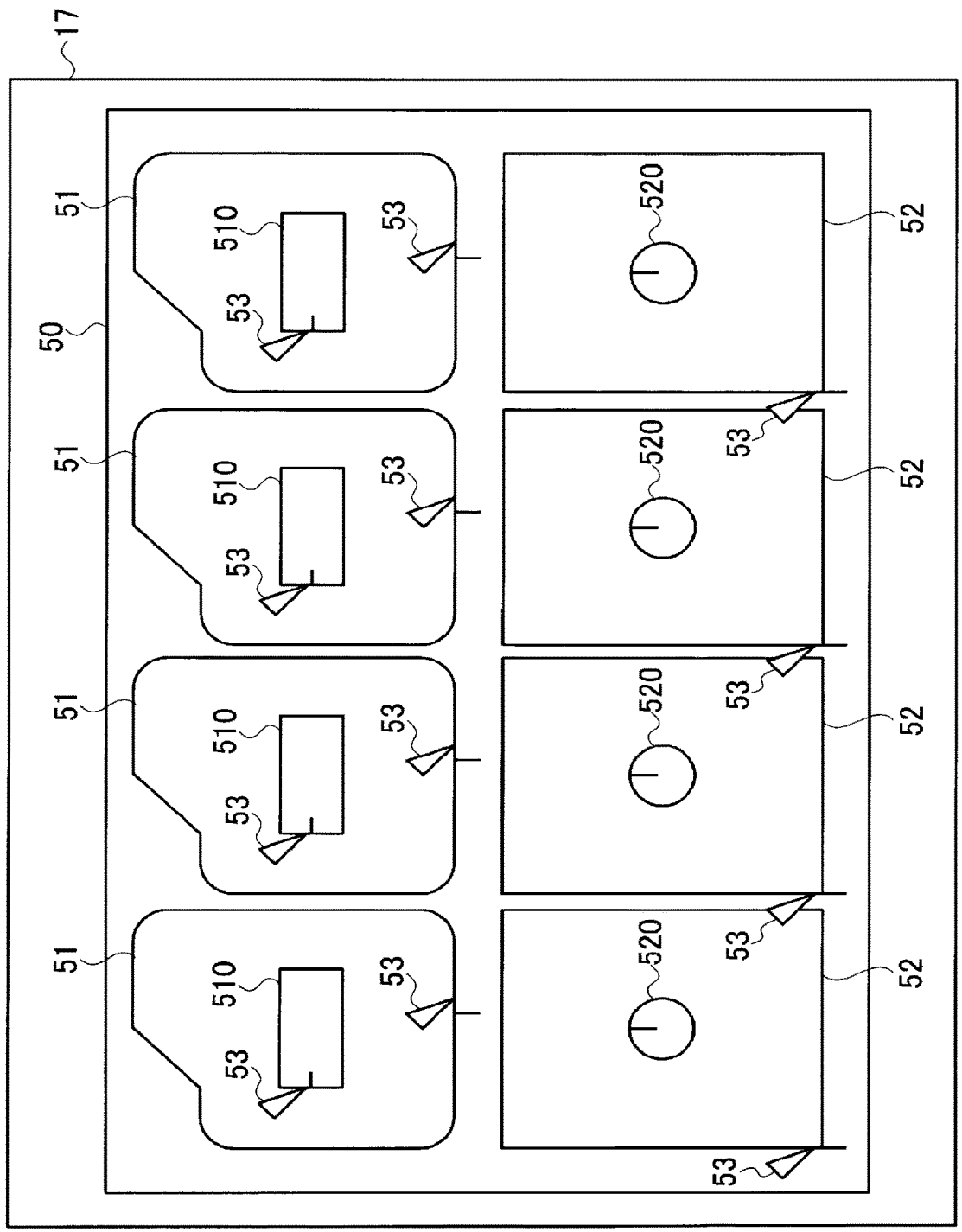
FIG. 10 is a view showing an example of a display image of a sheet cutting data.

FIG. 10 shows an example of a display image of the sheet cutting data displayed on the touch panel 17. In the example shown in FIG. 10, four first part images 51 each indicating an outer peripheral line of a first part and four second part images 52 each indicating an outer peripheral line of a second part are arranged in a rectangular line 50 indicating the outer periphery of the sheet metal. The first part image 51 includes a rectangular cutting line 510 for forming a rectangular opening on the inside. The second part image 52 includes a circular cutting line 520 for forming a circular opening on the inside.

In the example shown in FIG. 10, the processing program is created so as to cut out each one of the first and second parts from the sheet metal. Based on the sheet cutting data, the NC device 21 controls the processing machine body 27 so as to repeat the cutting of the sheet metal in accordance with the processing program four times.

Joints are set at the end of the first part and a scrap to be cut by the rectangular cutting line 510 inside the first part, and joint marks 53 indicating the positions of the joints are displayed. A joint is set at the end of the second part, and a joint mark 53 indicating the position of the joint is displayed.

The display controller 16 displays the display image of the sheet cutting data with a different color for each processing condition. The processing condition is specified by a processing condition number called an E number. The E number includes E1 to E9. In the processing program shown in FIG. 3, E004 indicates the E number E4, and the cutting of the sheet metal subsequent to E004 is performed under the processing condition of the E number E4. For example, the outer peripheral lines of the first and second parts are set to be cut under the processing condition of the E number E4, and the first part image 51 and the second part image 52 are displayed in white.

The rectangular cutting line 510 is set to be cut under the processing condition of the E number E2 and is displayed in blue. The circular cutting line 520 is set to be cut under the processing condition of the E number E3 and is displayed in yellow. With the color being set for each of the E numbers E1 to E9, the operator can easily understand which portion is to be cut under which processing condition in accordance with the color of the display image of the sheet cutting data displayed on the touch panel 17.

Suppose that the operator checked the sheet metal cut by the laser processing machine 20 and found that the joint amount of the joint provided at the end of the first part is not appropriate. The operator checks that the first part image 51 (the outer peripheral line of the first part) is displayed in white by using the display image of the sheet cutting data shown in FIG. 10.

The operator operates the touch panel 17 or another operating section to instruct the touch panel 17 to display a joint amount compensation setting image for compensating the joint amount. When instructed to display the joint amount compensation setting image, the display controller 16 controls the touch panel 17 so as to display a joint amount compensation setting image 60 shown in FIG. 11. The joint amount compensation setting image 60 includes operating sections 61 to 69 for increasing or decreasing the joint amount in accordance with the E numbers E1 to E9.

In one or more embodiments, the E number is used as joint specifying information for specifying a joint. That is, the E numbers E1 to E9 associated with joint compensation amounts indicate joints provided at cutting lines obtained by cutting the sheet metal by the E numbers E1 to E9, respectively.

The operating sections 61 to 69 each have a scale 601 indicating the degree of increase in the right direction and the degree of decrease in the left direction with non-compensated 0 at the center and a slider 602 for increasing or decreasing the joint amount by moving along the scale 601. Increasing the joint amount means extending the distance of the joint, and decreasing the joint amount means shortening the distance of the joint. The operating sections 61 to 69 each have a color mark 603 indicating which color the display image of the sheet cutting data is displayed in corresponding to the E number, and an increased/decreased value 604 of the joint amount corresponding to the position of the slider 602 in the horizontal direction.

Figure 11:
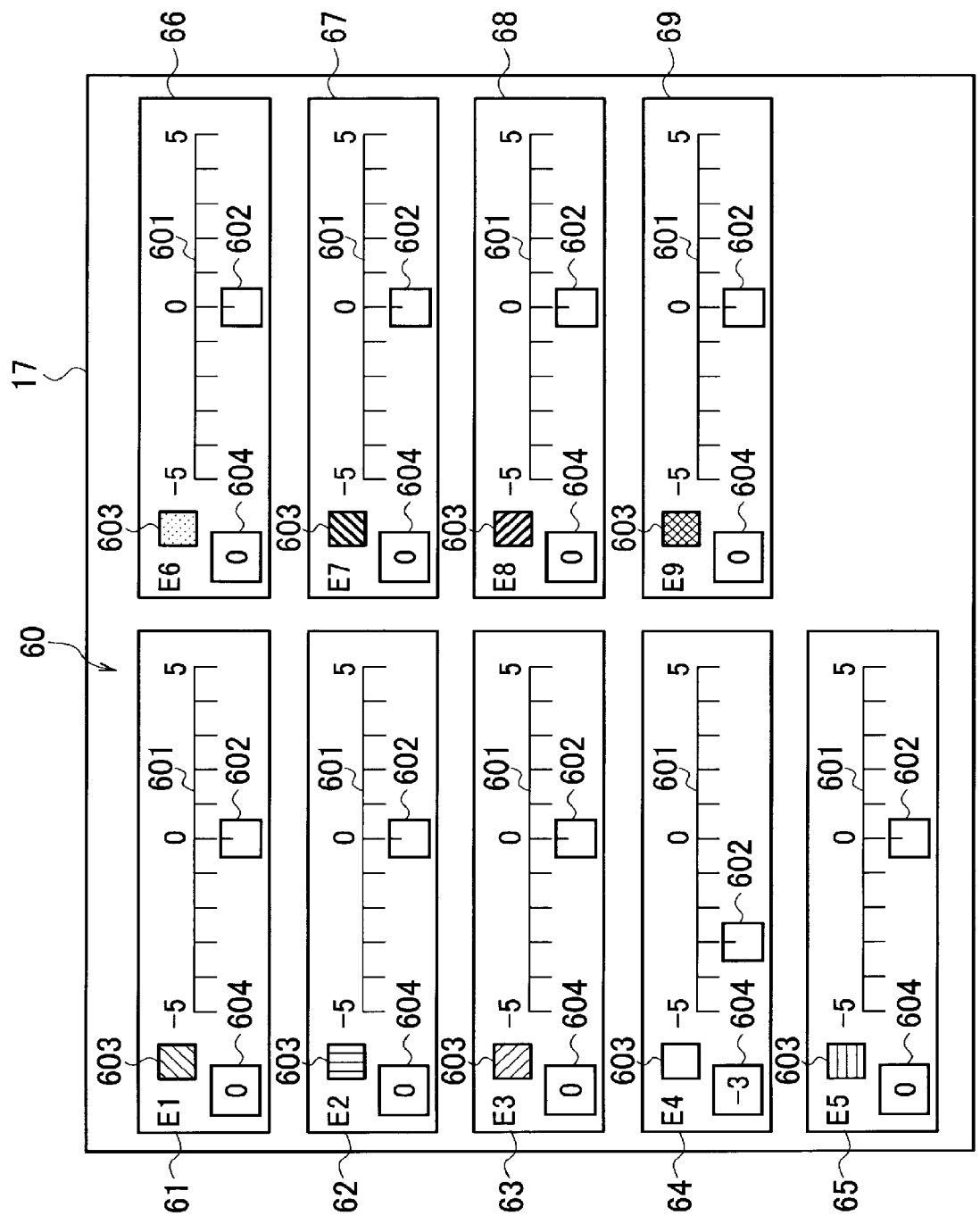
FIG. 11 is a view showing an example of a joint amount compensation setting image.

In FIG. 11, the difference in the color of the color mark 603 is represented by the presence or absence of hatching and the pattern of hatching. The numerical values of each of the scale 601 and the increased/decreased value 604 does not indicate a distance as a physical amount to extend or shorten the joint but is a relative increased/decreased value to indicate a degree to which the joint is extended or shortened.

It is assumed that the operator has moved the slider 602 in the operating section 64 of the E number E4 to a position of minus 3, as shown in FIG. 11. When any one of the sliders 602 in the operating sections 61 to 69 is operated by using the joint amount compensation setting image 60 shown in FIG. 11 to give an instruction to increase or decrease the joint amount, the central controller 11 responds to the increase or decrease instruction to supply a relative increased/decreased value to the joint compensation amount generator 15. In the example shown in FIG. 11, the central controller 11 supplies minus 3 as the relative increased/decreased value to the joint compensation amount generator 15.

The joint compensation amount generator 15 converts a relative increased/decreased value into a distance to generate a joint compensation amount by using the joint amount conversion parameter stored in the storage 12. The joint amount conversion parameter can be constituted using a coefficient for converting a relative increased/decreased value into a distance. The joint compensation amount generator 15 may convert a relative increased/decreased value into a distance by using a joint amount conversion parameter selected from a plurality of joint amount conversion parameters. The joint compensation amount generator 15 may select a joint amount conversion parameter in accordance with a difference in at least one of the thickness, material, and cutting velocity of the sheet metal.

The central controller 11 causes the storage 12 to store the generated joint compensation amount in association with the E number. Subsequently, the central controller 11 transmits the joint compensation amount associated with the E number to the NC device 21. The joint compensation amount storage 26 stores the joint compensation amount associated with the E number transmitted from the joint amount control device 10.

With the joint compensation amount stored in the joint compensation amount storage 26, when the NC device 21 controls the processing machine body 27 so as to cut the cutting path of the corresponding E number, the interpreter 23 compensates the joint amount so as to be increased or decreased by the joint compensation amount. In the example shown in FIG. 11, since the joint amount at the time of cutting the cutting path of the E number E4 is compensated, the joint amounts of the joints provided at the ends of the first and second parts are compensated. On the other hand, the joint amount of the joint provided in the scrap to be cut by the rectangular cutting line 510 is not compensated, and the joint amount determined by the original processing program is maintained.

While the operator finds the joint amount of the joint provided at the end of the first part to be not appropriate and compensates the joint amount of the joint at the time of cutting the cutting path of the E number E4 in the above description, the joint amount of the joint provided at the end of the second part is also compensated. Since the outer peripheral line of the first part and the outer peripheral line of the second part are cut under the same processing condition of the E number E4, when the joint amount of the joint at the end of the first part is not appropriate, there is a high possibility that the joint amount of the joint at the end of the second part is also not appropriate. Hence it is preferable that the joint amount of the joint at the end of the second part be also compensated.

Figure 12A:
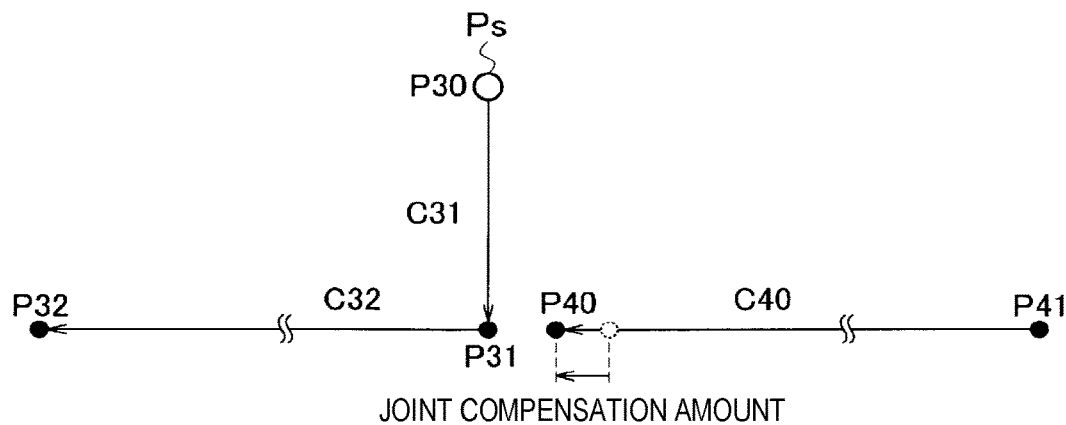
FIG. 12A is a view showing a state where the joint amount of the joint in the first example of the joint forming method shown in FIG. 2A has been decreased.

When the joint shown in FIG. 2A is used, the interpreter 23 compensates the joint amount as shown in FIG. 12A. FIG. 12A shows a case where the joint amount is decreased. The interpreter 23 shifts the cutting end point P40 by the joint compensation amount in the cutting advancing direction (the direction in which the joint amount is decreased) or in the opposite direction (the direction in which the joint amount is increased) to compensate the joint amount.

Figure 12B:
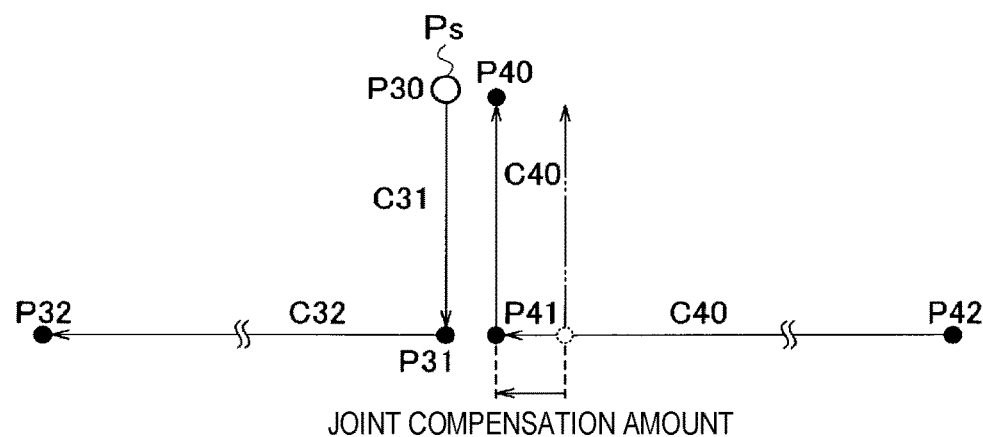
FIG. 12B is a view showing a state where the joint amount of the joint in the second example of the joint forming method shown in FIG. 2B has been decreased.

When the joint shown in FIG. 2B is used, the interpreter 23 compensates the joint amount as shown in FIG. 12B. FIG. 12B shows a case where the joint amount is decreased. The interpreter 23 shifts the point P41 by the joint compensation amount in the cutting advancing direction (the direction in which the joint amount is decreased) or in the opposite direction (the direction in which the joint amount is increased) and shifts the cutting path C40 up to the cutting end point P40 in accordance with the shift of the point P41.

Figure 12C:
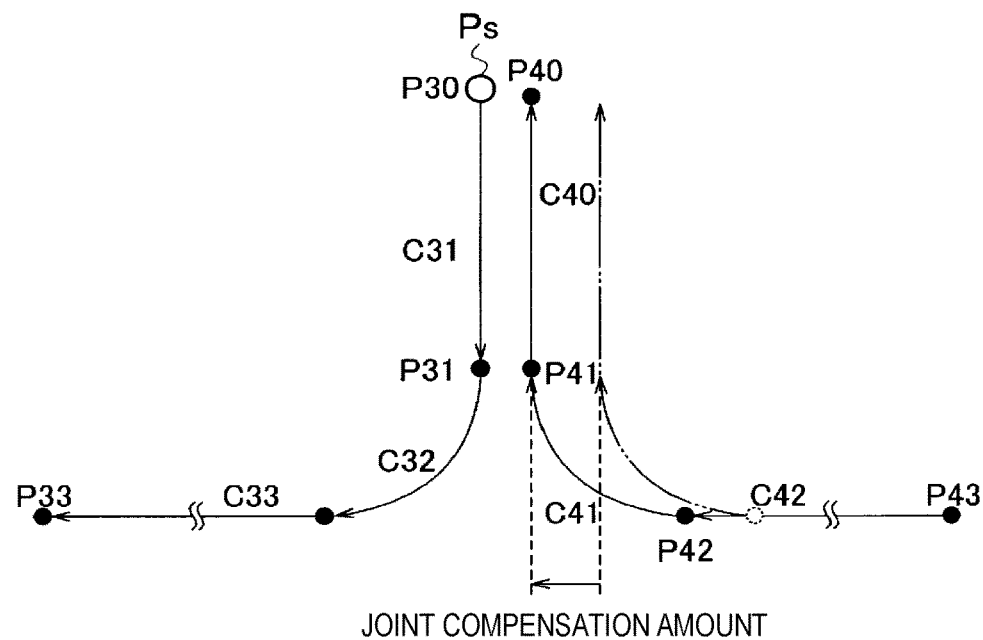
FIG. 12C is a view showing a state where the joint amount of the joint in the third example of the joint forming method shown in FIG. 2C has been decreased.

When the joint shown in FIG. 2C is used, the interpreter 23 compensates the joint amount as shown in FIG. 12C. FIG. 12C shows a case where the joint amount is decreased. The interpreter 23 shifts the point P42 by the joint compensation amount in the cutting advancing direction (the direction in which the joint amount is decreased) or in the opposite direction (the direction in which the joint amount is increased) and shifts the cutting path C41 to the point P41 and the cutting path C40 to the cutting end point P40 in accordance with the shift of the point P42.

As described above, when the operator operates to increase or decrease the joint amount of the joint corresponding to any E number, the joint amount control device 10 generates a joint compensation amount corresponding to the operation by the operator and supplies the joint compensation amount to the NC device 21. When the joint compensation amount is input to the NC device 21 during the cutting of one sheet metal, after the point in time when the joint compensation amount is stored into the joint compensation amount storage 26, the laser processing machine 20 compensates the joint amount of the joint corresponding to the E number for which the joint compensation amount has been set, and cuts the sheet metal.

When the joint compensation amount is input after the cutting of one sheet metal, for the next one metal and subsequent sheet metals, the laser processing machine 20 compensates the joint amount of the joint corresponding to the E number for which the joint compensation amount has been set, and cuts the sheet metal.

According to one or more embodiments, it is possible to compensate the joint amount without re-creating a processing program. According to one or more embodiments, even when one sheet metal is being cut, it is possible to set the joint compensation amount and to compensate the joint amount. According to one or more embodiments, it is not necessary to edit the processing program by interrupting the processing of the sheet metal.

With reference to FIGS. 13 and 14A to 14C, a description will be given of a joint amount control method executed by the joint amount control device 10 or processing of a joint amount control program executed by the CPU when the joint amount control device 10 is constituted using the computer equipment.

Figure 13:
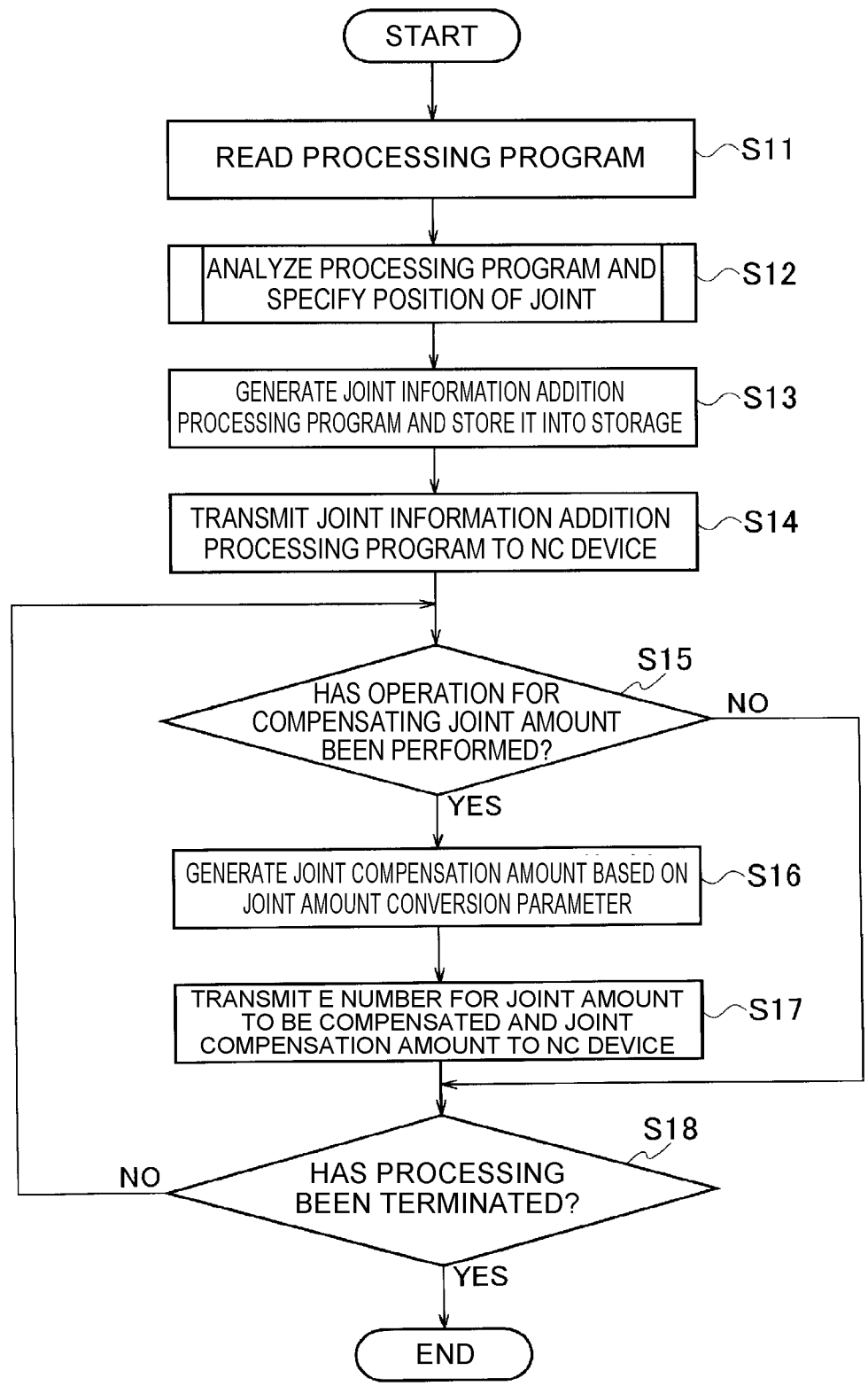
FIG. 13 is a flowchart showing a joint amount control method executed by the joint amount control device or processing executed by a joint amount control program in the first configuration example shown in FIG. 1.

In FIG. 13, the central controller 11 (CPU) reads a processing program in step S11. In step S12, the processing program analyzer 13 (CPU) analyzes the processing program and specifies a position of a joint. In step S13, the joint information adder 14 (CPU) generates a joint information addition processing program and stores the program into the storage 12. In step S14, the central controller 11 transmits the joint information addition processing program to the NC device 21.

In step S15, the central controller 11 determines whether or not an operation for compensating the joint amount has been performed. When the operation for compensating the joint amount has not been performed (NO), the central controller 11 moves the processing to step S18. When the operation for compensating the joint amount has been performed (YES), the joint compensation amount generator 15 (CPU) generates a joint compensation amount based on the joint amount conversion parameter in step S16, and the central controller 11 causes the storage 12 to store the joint compensation amount.

In step S17, the central controller 11 transmits the E number for the joint amount to be compensated and the joint compensation amount to the NC device 21. In step S18, the central controller 11 determines whether or not the processing has been terminated by the termination of the processing program. When the processing has not been terminated (NO), the processing of steps S15 to S18 is repeated. Since the processing of steps S15 to S18 is repeated, the operator can compensate the joint amount at any timing and transmit the joint compensation amount to the NC device 21.

When the processing has been terminated in step S18 (YES), the central controller 11 terminates the joint amount compensation processing by the joint amount control device 10. According to the processing shown in FIG. 13, it is possible to compensate the joint amount at any timing before the start of the processing, during the processing, or during the stoppage of the processing before the termination of the processing.

Figure 14A:
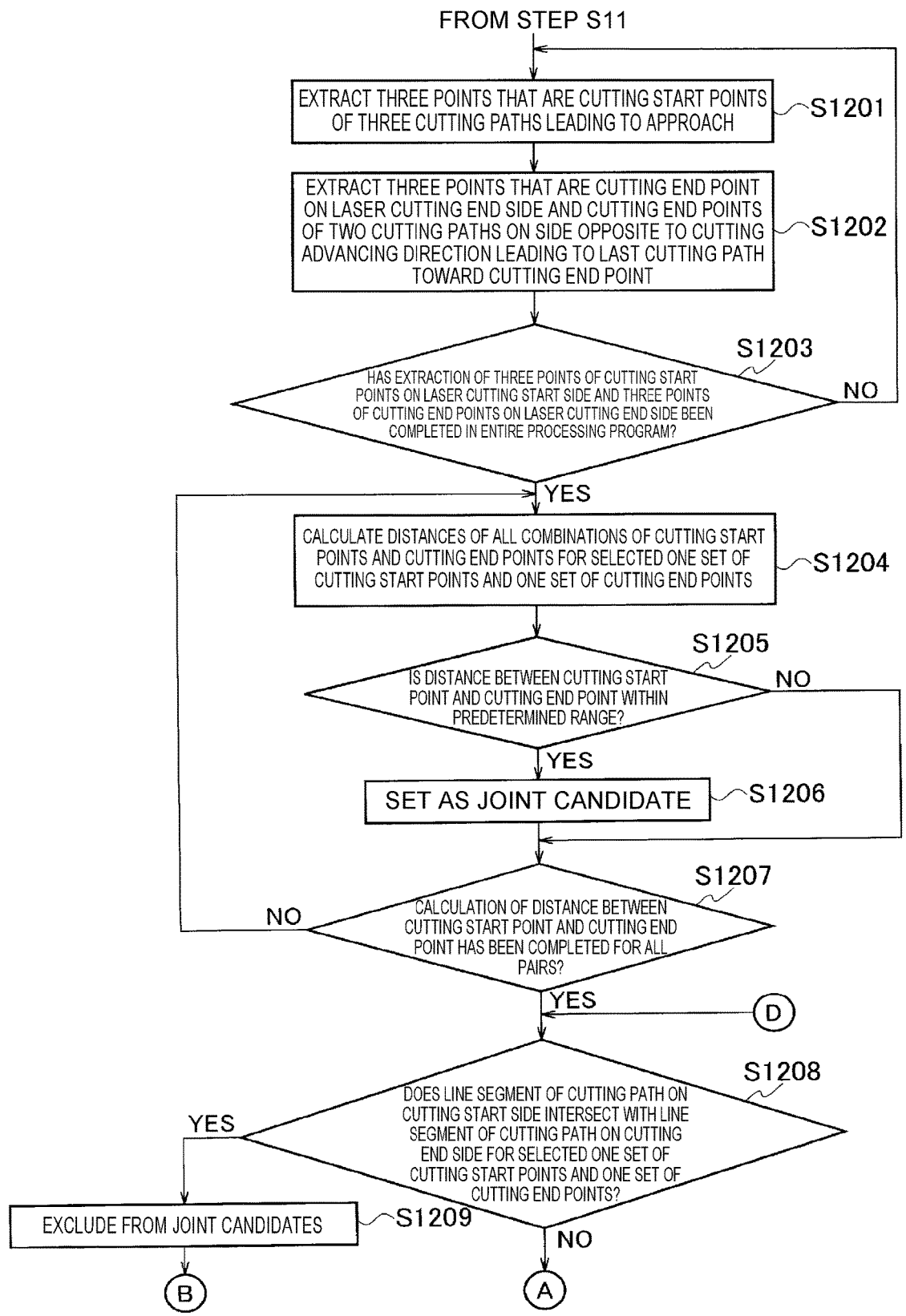
FIG. 14A is a partial flowchart showing detailed processing of step S12 in FIG. 13.
Figure 14B:
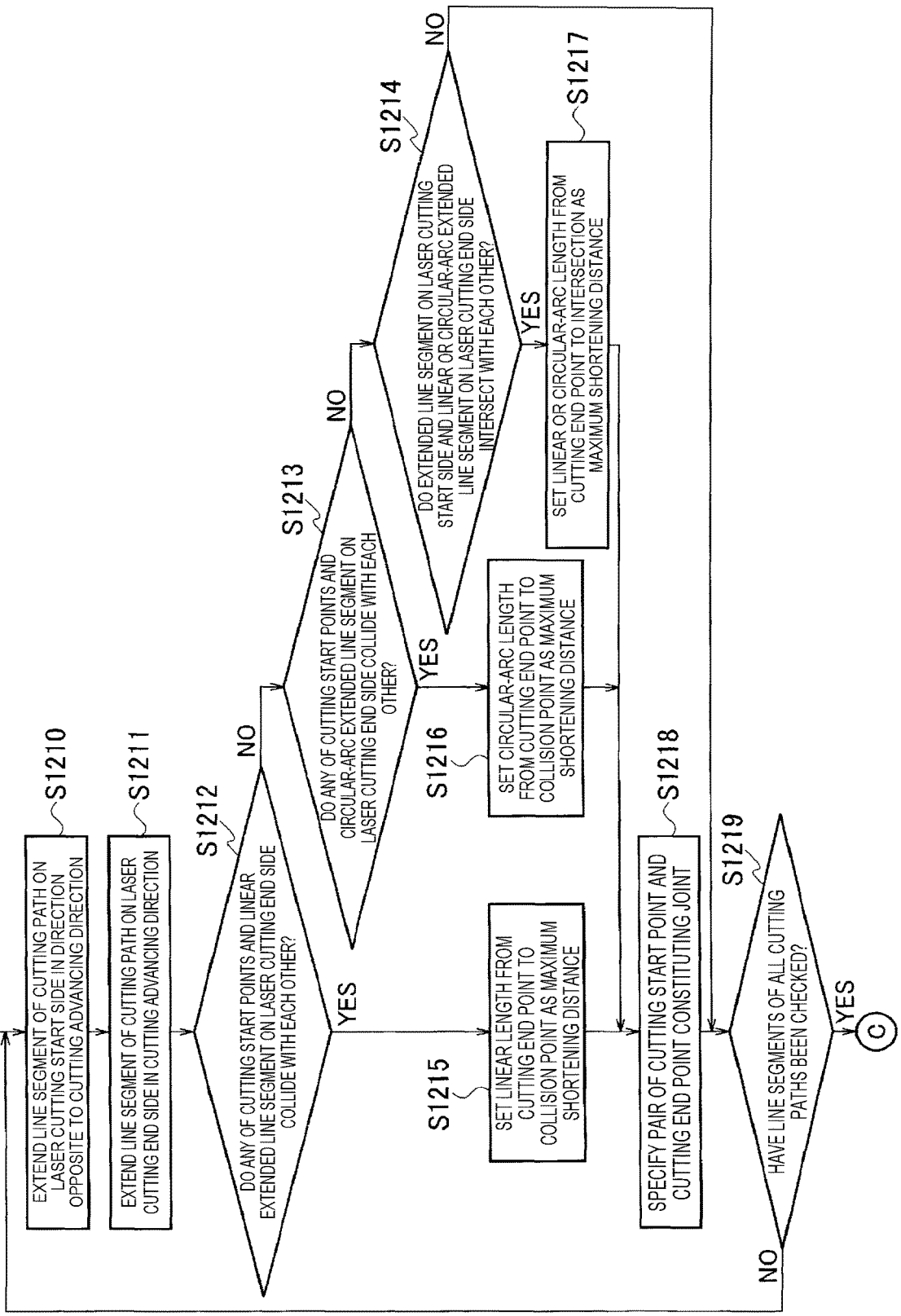
FIG. 14B is a partial flowchart showing the detailed processing of step S12 in FIG. 13, which is linked to the flowchart shown in FIG. 14A.
Figure 14C:
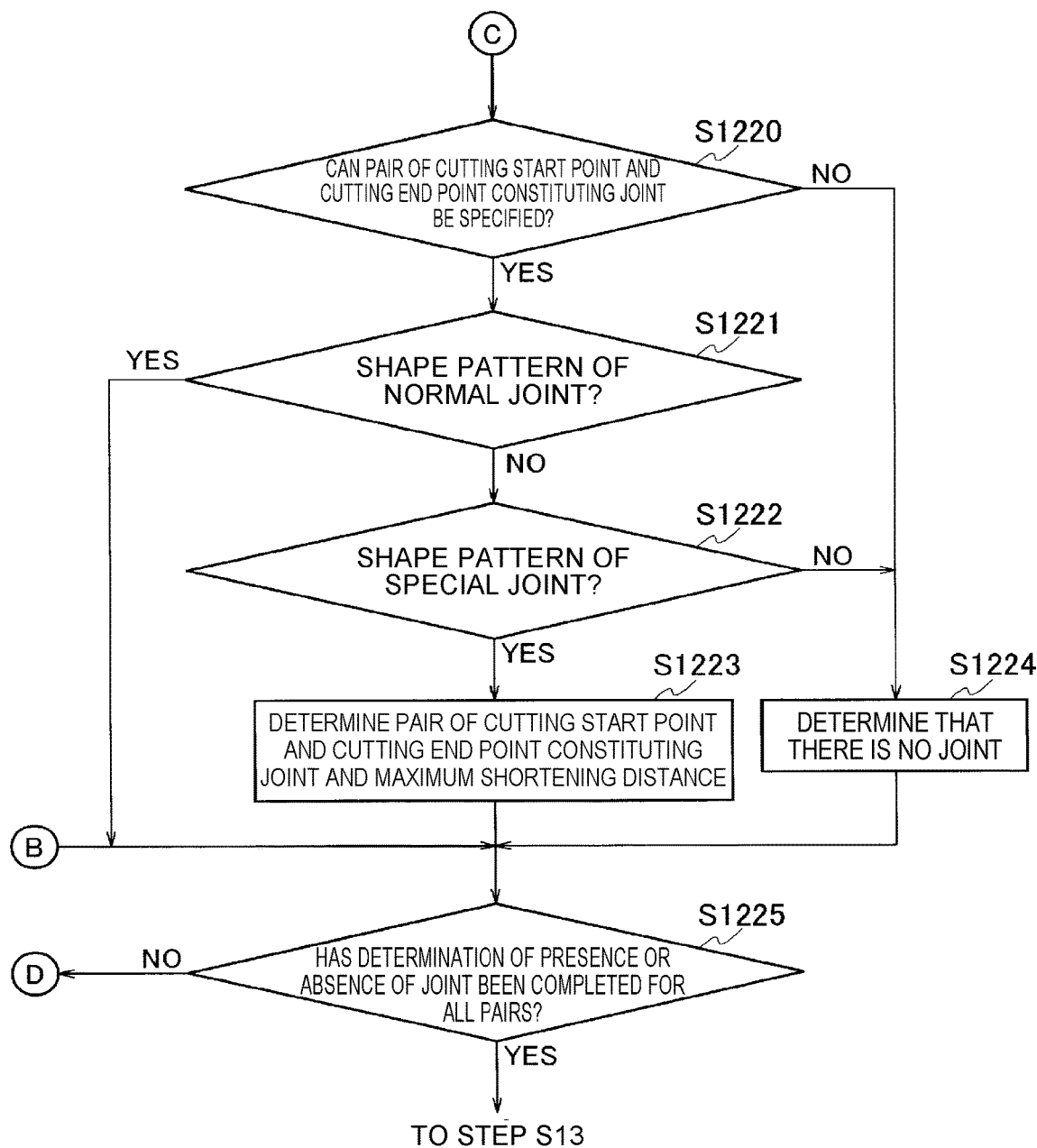
FIG. 14C is a partial flowchart showing the detailed processing of step S12 in FIG. 13, which is linked to the flowchart shown in FIG. 14B.

FIGS. 14A to 14C show the detailed processing of step S12. In FIG. 14A, in step S1201, the processing program analyzer 13 extracts three points that are cutting start points of three cutting paths leading to an approach from a pierced hole Ps on the laser cutting start side. In step S1202, the processing program analyzer 13 extracts three points that are a cutting end point P40 on the laser cutting end side and cutting end points of two cutting paths on the side opposite to the cutting advancing direction leading to the last cutting path toward the cutting end point P40. Step S1201 and step S1202 may be performed in reverse order or may be performed at the same time.

In step S1203, the processing program analyzer 13 determines whether or not the extraction of the three points of the cutting start points on the laser cutting start side and the three points of the cutting end points on the laser cutting end side has been completed in the entire processing program. When the extraction has not been completed in the entire processing program (NO), the processing program analyzer 13 repeats the processing of steps S1201 to S1203.

When the extraction of the entire processing program has been completed (YES) in step S1203, the processing program analyzer 13 calculates the distances of all combinations of the selected one set of cutting start points and one set of cutting end points in step S1204. In step S1205, the processing program analyzer 13 determines whether or not the distance between the cutting start point and the cutting end point is within a predetermined range.

When the distance between the cutting start point and the cutting end point is within the predetermined range (YES) in step S1205, the processing program analyzer 13 sets the cutting start point and the cutting end point as a joint candidate in step S1206 and moves the processing to step S1207. When the distance between the cutting start point and the cutting end point is not within the predetermined range (NO) in step S1205, the processing program analyzer 13 moves the processing to step S1207.

In step S1207, the processing program analyzer 13 determines whether or not the calculation of the distance between the cutting start point and the cutting end point has been completed for all pairs. When the calculation of the distance between the cutting start point and the cutting end point has not been completed for all the pairs (NO), the processing program analyzer 13 repeats the processing of steps S1204 to S1207.

When the distance between the cutting start point and the cutting end point has been calculated for all the pairs (YES) in step S1207, the processing program analyzer 13 moves the processing to step S1208.

In step S1208, the processing program analyzer 13 determines whether or not the line segment of the cutting path on the laser cutting start side intersects with the line segment of the cutting path on the laser cutting end side for the selected one set of cutting start points and one set of cutting end points. When the line segment of the cutting path on the laser cutting start side intersects with the line segment of the cutting path on the laser cutting end side (YES), the processing program analyzer 13 excludes the selected one set of cutting start points and one set of cutting end points from the joint candidates in step S1209 and moves the processing to step S1225 in FIG. 14C.

When the line segment of the cutting path on the laser cutting start side does not intersect the line segment of the cutting path on the laser cutting end side (NO) in step S1208, the processing program analyzer 13 extends the line segment of the cutting path on the laser cutting start side in the direction opposite to the cutting advancing direction in step S1210 of FIG. 14B and extends the line segment of the cutting path on the laser cutting end side in the cutting advancing direction in step S1211.

In step S1212, the processing program analyzer 13 determines whether or not any of the cutting start points and the linear extended line segment on the laser cutting end side collide with each other. When any of the cutting start points and the linear extended line segment on the laser cutting end side collide with each other (YES), the processing program analyzer 13 sets the linear length from the cutting end point, which is the start end of the linear extended line segment, to the collision point as the maximum shortening distance in step S1215 and moves the processing to step S1218.

When any of the cutting start points and the linear extended line segment on the laser cutting end side do not collide with each other (NO) in step S1212, the processing program analyzer 13 determines in step S1213 whether or not any of the cutting start points and the circular-arc extended line segment on the laser cutting end side collide with each other. When any of the cutting start points and the circular-arc extended line segment on the laser cutting end side collide with each other (YES), the processing program analyzer 13 sets the circular-arc length from the cutting end point, which is the start end of the linear extended line segment, to the collision point as the maximum shortening distance in step S1216 and moves the processing to step S1218.

When any of the cutting start points and the circular-arc extended line segment on the laser cutting end side does not collide with each other (NO) in step S1213, the processing program analyzer 13 determines in step S1214 whether or not any of the cutting start points and the linear or circular-arc extended line segment on the laser cutting end side intersect with each other. When any of the cutting start points and the linear or circular-arc extended line segment on the laser cutting end side intersect (YES), the processing program analyzer 13 sets the linear or circular-arc length from the cutting end point, which is the start end of the linear extended line segment, to the intersection as the maximum shortening distance in step S1217 and moves the processing to step S1218.

In step S1218, the processing program analyzer 13 specifies a pair of the cutting start point and the cutting end point constituting the joint and moves the processing to step S1219. When any of the cutting start points and the linear or circular-arc extended line segment on the laser cutting end side do not intersect with each other (NO) in step S1214, the processing program analyzer 13 moves the processing to step S1219.

In step S1219, the processing program analyzer 13 determines whether or not line segments of all cutting paths have been checked. When the line segments of all the cutting paths have not been checked (NO), the processing program analyzer 13 repeats the processing of steps S1210 to S1219. When the line segments of all the cutting paths have been checked (YES), the processing program analyzer 13 moves the processing to step S1220 in FIG. 14C.

In FIG. 14C, in step S1220, the processing program analyzer 13 determines whether or not a pair of the cutting start point and the cutting end point constituting a joint can be specified. When a pair of the cutting start point and the cutting end point constituting a joint cannot be specified (NO), the processing program analyzer 13 determines in step S1224 that there is no joint in the combinations of the selected one set of cutting start points and one set of cutting end points and moves the processing to step S1225.

When a pair of the cutting start point and the cutting end point constituting a joint can be specified (YES) in step S1220, the processing program analyzer 13 determines in step S1221 whether or not the joint has a shape pattern of a normal joint as shown in FIGS. 2A, 2B, and 8A to 8C, not including the minute circular arc as shown in FIG. 2C. When the joint has the shape pattern of the normal joint (YES), the processing program analyzer 13 moves the processing to step S1225. When the joint does not have the shape pattern of the normal joint (NO), the processing program analyzer 13 moves the processing to step S1222.

In step S1222, the processing program analyzer 13 determines whether or not the joint has a shape pattern of a special joint including the minute circular arc as shown in FIG. 2C. When the joint does not have the shape pattern of the special joint (NO), in step S1224, the processing program analyzer 13 determines that there is no joint in the combinations of the selected one set of cutting start points and one set of cutting end points and moves the processing to step S1225.

When the joint has the shape pattern of the special joint (YES) in step S1222, in step S1223, the processing program analyzer 13 determines a pair of the cutting start point and the cutting end point constituting a joint and the maximum shortening distance and moves the processing to step S1225. Taking FIG. 7C as an example, before step S1223, the distance between the cutting start point P32 and the cutting end point P42 is once set as the maximum shortening distance. In step S1223, the distance between the cutting start point P31 and the cutting end point P41 is set as the maximum shortening distance instead of the distance between the cutting start point P32 and the cutting end point P42.

In step S1225, the processing program analyzer 13 determines whether or not the determination of the presence or absence of a joint has been completed for all the pairs. When the determination of the presence or absence of the joint has not been completed for all the pairs (NO), the processing program analyzer 13 returns the processing to step S1208 of FIG. 14A and repeats the processing of steps S1208 to S1225. When the determination of the presence or absence of the joint has been completed for all the pairs (YES), the processing program analyzer 13 moves the processing to step S13 in FIG. 13.

Figure 15:
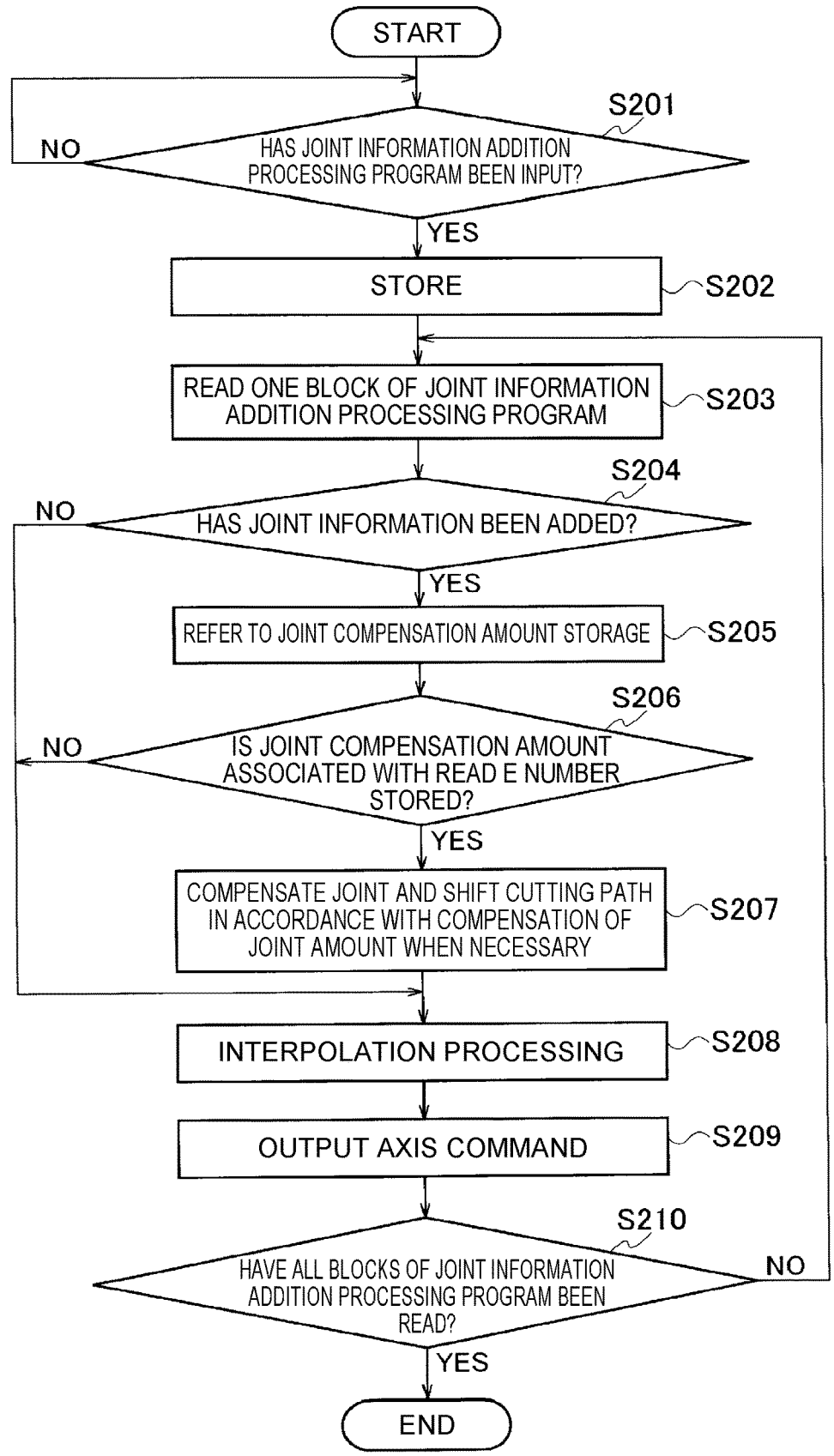
FIG. 15 is a flowchart showing processing executed by an NC device of a laser processing machine in the first configuration example shown in FIG. 18.

Processing executed by the NC device 21 will be described with reference to FIG. 15. In FIG. 15, when starting the processing, the NC device 21 determines in step S201 whether or not a joint information addition processing program has been input. When the joint information addition processing program has not been input (NO), the NC device 21 repeats the processing of step S201. When the joint information addition processing program has been input (YES), the NC device 21 stores the joint information addition processing program in step S202.

In step S203, the NC device 21 (interpreter 23) reads one block of the joint information addition processing program. One block is one line (one path). In step S204, the NC device 21 (interpreter 23) determines whether or not joint information has been added to the read one block. When joint information has not been added (NO), the NC device 21 moves the processing to step S208.

When joint information has been added in step S204 (YES), the interpreter 23 refers to the joint compensation amount storage 26 in step S205. In step S206, the interpreter 23 determines whether or not the joint compensation amount associated with the read E number is stored. When the joint compensation amount is not stored (NO), the NC device 21 moves the processing to step S208.

When the joint compensation amount is stored (YES) in step S206, in step S207, the interpreter 23 compensates the joint amount by the joint compensation amount, shifts the cutting path in accordance with the compensation of the joint amount when necessary, and moves the processing to step S208.

The NC device 21 (interpolator 24) executes interpolation processing in step S208, and the NC device (axis command output section 25) outputs axis commands to the motors 28x, 28y, 28z in step S209. In step S210, the interpreter 23 determines whether or not all the blocks of the joint information addition processing program have been read. When all the blocks have not been read (NO), the interpreter 23 repeats the processing of steps S203 to S210. When all blocks have been read (YES), the NC device 21 terminates the processing.

Figure 16:
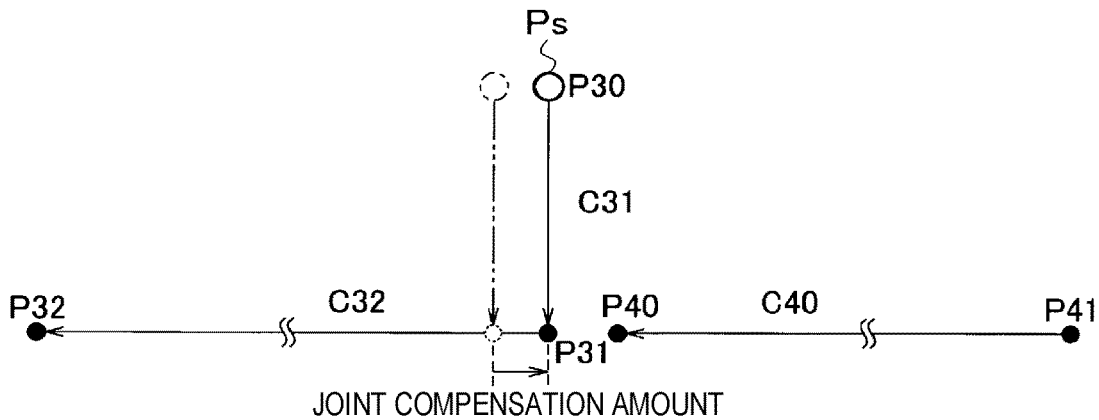
FIG. 16 is a view showing a state where the joint amount has been decreased by shifting the laser cutting start side in the joint in the first example of the joint forming method shown in FIG. 2A.

As shown in FIG. 16, in the joint amount control device, the joint amount control method, the joint amount control program, and the laser processing machine of the first configuration example described above, the NC device 21 may shift the cutting start point constituting the joint to compensate the joint amount. When the joint information is added to the code indicating the first endpoint on the laser cutting start side of the processing program, the joint amount can be compensated as shown in FIG. 16. The same applies to the joints in FIGS. 2B and 2C and other figures.

Figure 17:
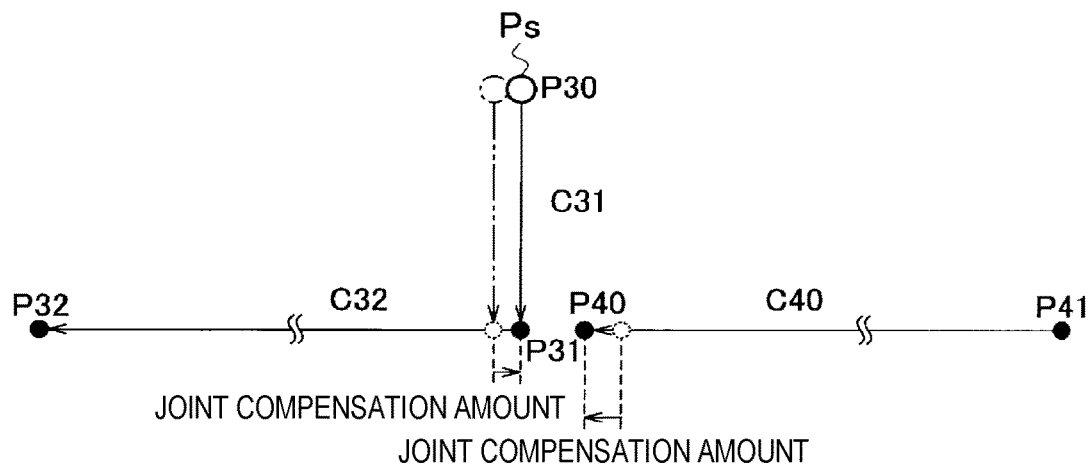
FIG. 17 is a view showing a state where the joint amount has been decreased by shifting both the laser cutting start side and the laser cutting end side in the joint in the first example of the joint forming method shown in FIG. 2A.

As shown in FIG. 17, the NC device 21 may shift both the cutting start point and the cutting end point constituting the joint to compensate the joint amount. When the joint information is added to both the code indicating the first endpoint on the laser cutting start side and a code indicating a second endpoint on the laser cutting end side of the processing program, the joint amount can be compensated as shown in FIG. 17. The same applies to the joints in FIGS. 2B and 2C and other figures.

Figure 18:
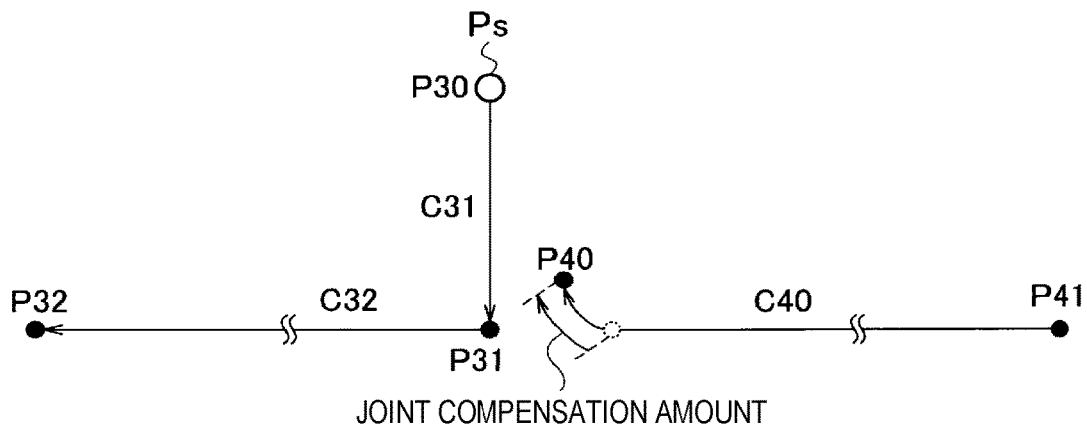
FIG. 18 is a view showing a state where the joint amount has been compensated so as to add a circular-arc-shaped escape in the joint in the first example of the joint forming method shown in FIG. 2A.

As shown in FIG. 18, the NC device 21 may not only increase or decrease the distance between the first endpoint and the second endpoint but may also compensate the joint amount so as to add a circular-arc-shaped escape. When the circular-arc-shaped escape is added to the second endpoint (here, the cutting end point P40) before compensation, and the tip end of the escape is newly set as the second endpoint, it is possible to set the second endpoint at a position away outward from the end of the part while decreasing the joint amount. In this case, the joint information adder 14 may add a symbol "$JNT:0.6R0.1," for example, to the code indicating the second endpoint of the processing program. R0.1 means adding a circular-arc-shaped escape with a radius of 0.1 mm.

In FIG. 18, the NC device 21 may compensate the joint amount so as to add a linear escape instead of adding the circular-arc-shaped escape. The linear escape is not limited to being added so as to be orthogonal to the cutting path C40 but may be an escape extending obliquely at an acute angle.

The joint compensation amount generator 15 converts a relative increased/decreased value for increasing or decreasing the joint amount into a distance to generate the joint compensation amount, but the operator may instruct a distance by which the joint amount is to be increased or decreased to generate the joint compensation amount based on the instruction. The joint compensation amount generator 15 may generate the joint compensation amount not by the operator's instruction but in an automatic manner.

Further, in one or more embodiments, the E number is used as the joint specifying information, but the following information may be used as the joint specifying information. The operator may directly designate one of a plurality of joints provided in the part, and information for specifying the designated joint may be used as joint specifying information. The operator may select one of a plurality of cutting paths at the time of cutting the sheet metal, and information for specifying a joint provided in the cutting path may be used as joint specifying information.

The operator may designate a partial region of the part, and information for specifying a joint provided in the designated region may be used as joint specifying information. At the time of cutting out a part larger in size than the sheet metal and a part smaller in size than the sheet metal, the size of the part may be selected, and information for specifying a joint provided in the part of the selected size may be used as joint specifying information. All joints provided in a part manufactured based on the processing program may be joints to be increased or decreased in the joint amount. Even in this case, information for specifying all the joints is joint specifying information.

Figure 19:
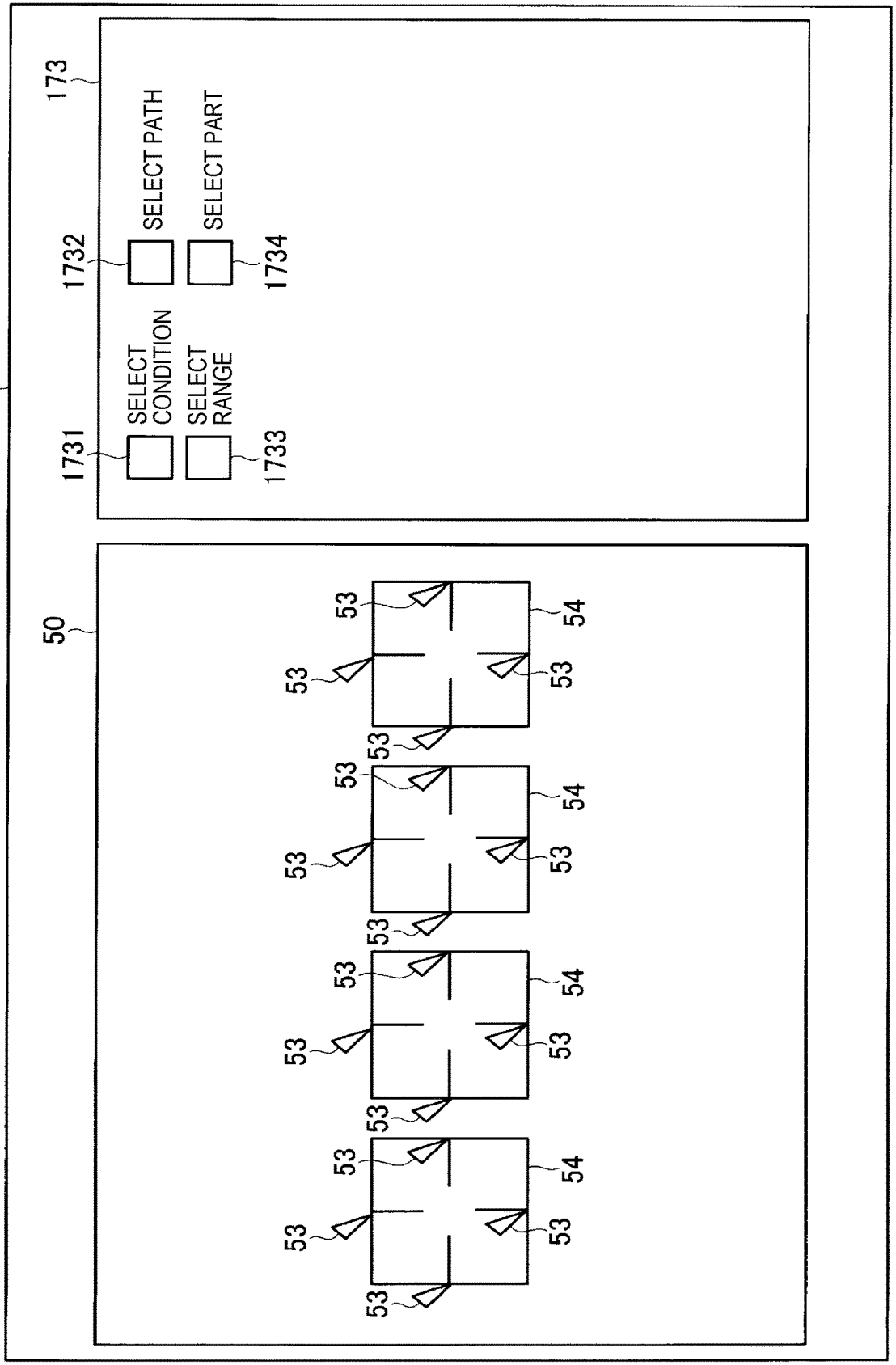
FIG. 19 is a view showing an example of a display image configured to display a joint amount compensation setting image by selecting joint specifying information.

FIG. 19 shows an example of a display image configured to display a joint amount compensation setting image by selecting joint specifying information. The touch panel 17 displays a display image of sheet cutting data and a window 173 for selecting joint specifying information. In the example shown in FIG. 19, four part images 54 are arranged as the display image of the sheet cutting data in a rectangular line 50 showing the outer periphery of the sheet metal. In the window 173, four selection buttons 1731 to 1734 indicating "select condition," "select path," "select range," and "select part" are displayed.

Figure 20:
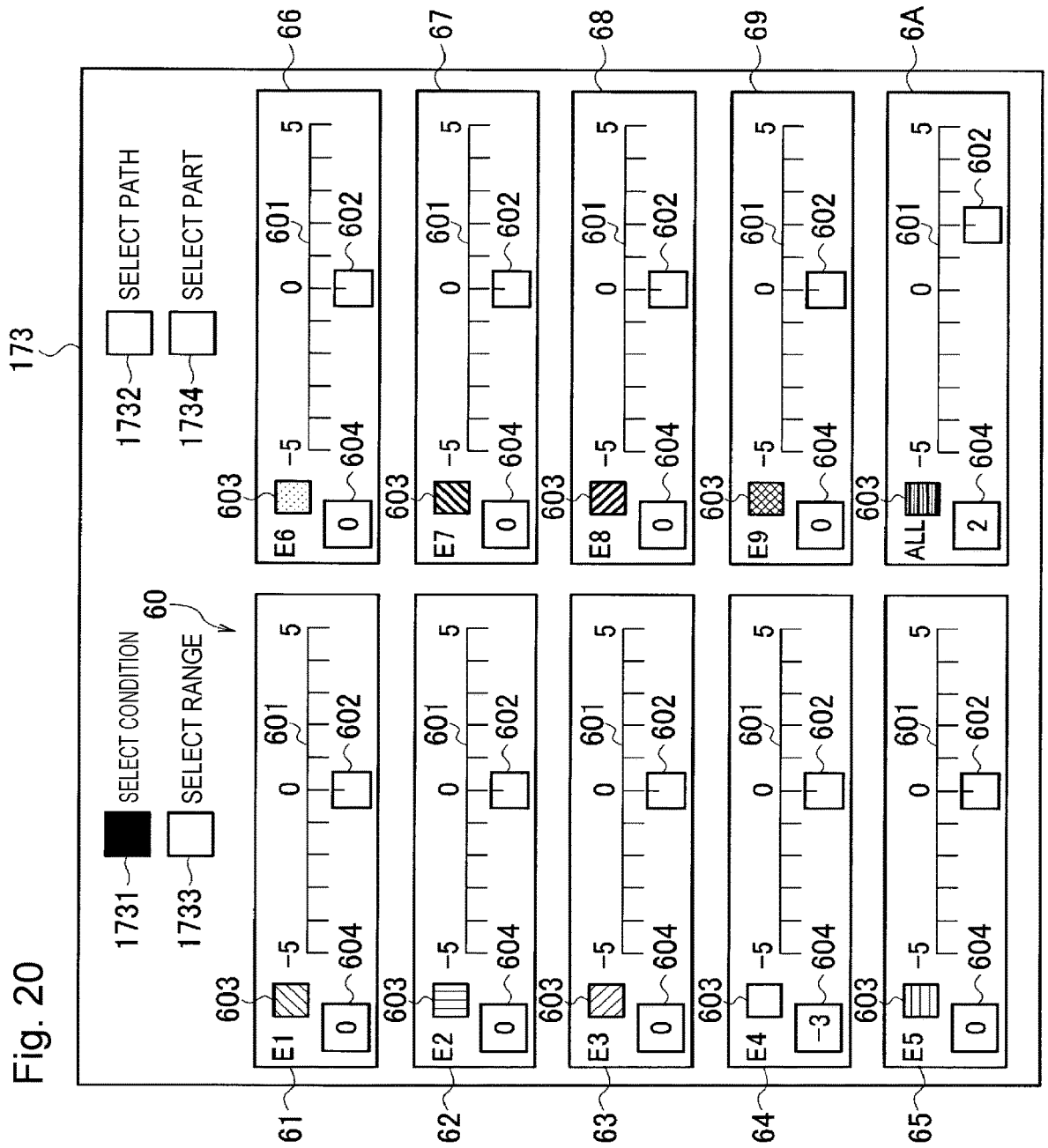
FIG. 20 is a view showing an example of a joint amount compensation setting image displayed when a selection button for condition selection is touched in the display image shown in FIG. 19.

When the selection button 1731 for condition selection is touched, as shown in FIG. 20, a joint amount compensation setting image 60 similar to that shown in FIG. 11 is displayed on the window 173. The joint amount compensation setting image 60 shown in FIG. 20 includes an operating section 6A for increasing or decreasing all the joint amounts of the E numbers E1 to E9 in addition to the operating sections 61 to 69 for increasing or decreasing the joint amounts corresponding to the E numbers E1 to E9. For example, when the operator moves the slider 602 in the operating section 6A to the position of plus 2, the relative increased/decreased values of all the joint amounts of the E numbers E1 to E9 are set to plus 2.

The joint compensation amount generator 15 generates a joint compensation amount of a joint formed when the laser processing machine 20 cuts the sheet metal under all the processing conditions of the E numbers E1 to E9, and the central controller 11 causes the storage 12 to store the joint compensation amount in association with all the E numbers E1 to E9. When the joint compensation amount associated with all the E numbers E1 to E9 is transmitted to the NC device 21 and stored into the joint compensation amount storage 26, the laser processing machine 20 compensates the joint amount by the joint compensation amount stored in the joint compensation amount storage 26 regardless of whether the sheet metal is cut under any processing condition of the E numbers E1 to E9.

The joint amount compensation setting image 60 displayed on the window 173 may be the joint amount compensation setting image 60 shown in FIG. 11, which does not include the operating section 6A.

Figure 21:
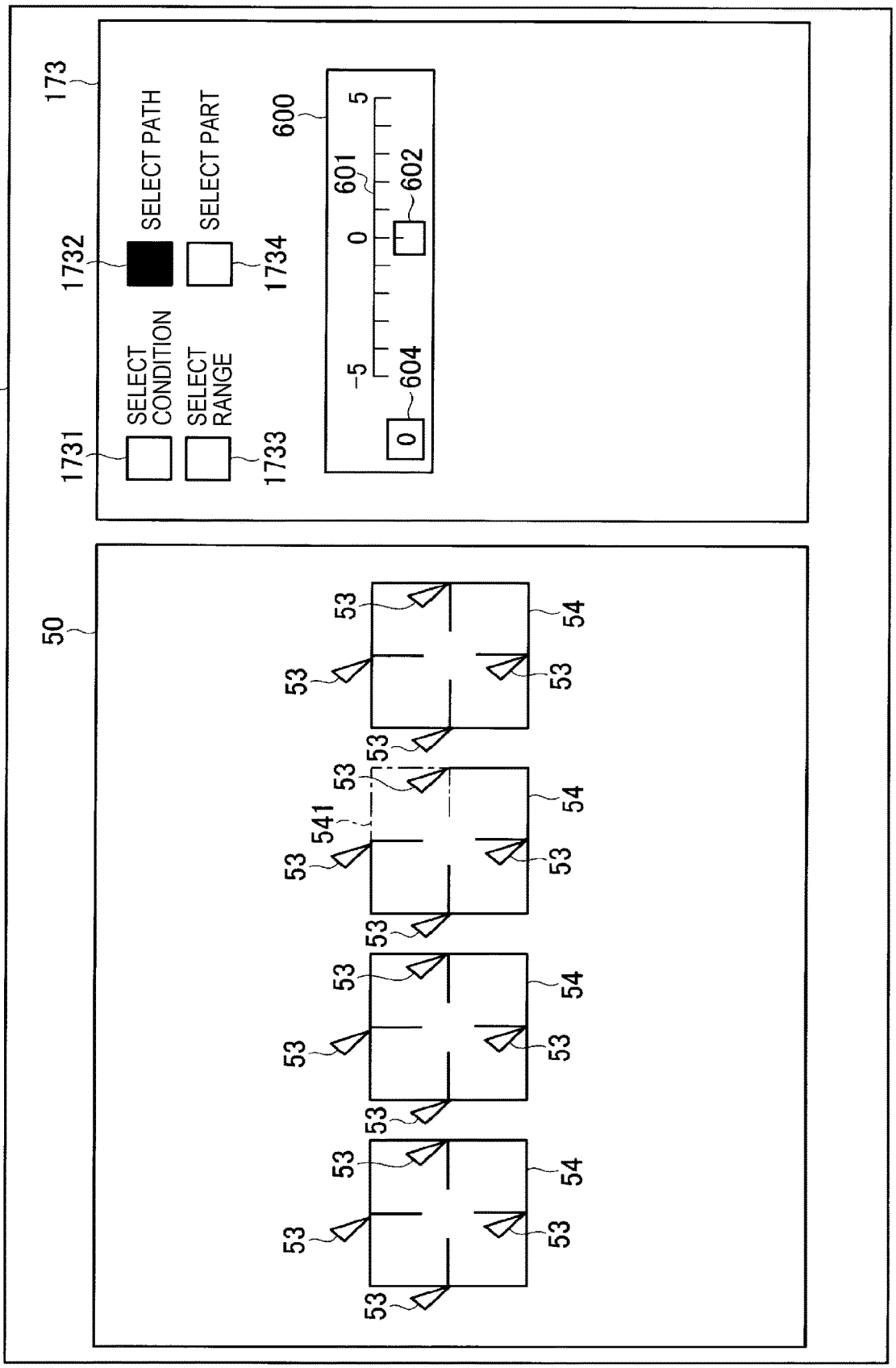
FIG. 21 is a view showing a state where one cutting path has been selected by touching a selection button for path selection in the display image shown in FIG. 19, and a joint existing in the selected cutting path has been set as a joint to be compensated for a joint amount.

FIG. 21 shows the window 173 in a state where the select button 1732 for path selection has been touched. For example, when the operator touches a cutting path 541 on the upper right of the second part image 54 from the right, the display controller 16 changes the color of the touched cutting path 541. In FIG. 21, the color-changed cutting path 541 is indicated by a dashed and dotted line. The central controller 11 sets only a joint existing in the color-changed cutting path 541 indicated by the dashed and dotted line as an object to be compensated for the joint amount. A joint amount compensation setting image 600 is displayed in the window 173. The joint to be compensated for the joint amount can be specified by a number (joint number) given to each of all the joints from the first joint to the last joint in a series of processing steps for cutting the sheet metal in accordance with the processing program based on the sheet cutting data.

When the operator moves the slider 602 in the joint amount compensation setting image 600 in the plus direction or the minus direction, the joint compensation amount generator 15 generates the joint compensation amount of the joint existing in the color-changed cutting path 541. The central controller 11 causes the storage 12 to store the joint compensation amount associated with the joint number. When the joint compensation amount associated with the joint number is transmitted to the NC device 21 and stored into the joint compensation amount storage 26, the laser processing machine 20 compensates the joint amount of the joint existing in the selected cutting path 541 by the joint compensation amount stored in the joint compensation amount storage 26.

FIG. 21 shows a state where only one cutting path 541 has been selected, but the operator may select two or more cutting paths.

When a joint with a specific joint number is set as the object to be compensated for the joint amount as shown in FIG. 21, the NC device 21 may determine whether or not the joint compensation amount is stored in the joint compensation amount storage 26 in association with the joint number of the joint existing in the cutting path to be cut in step S206 of FIG. 15.

Figure 22:
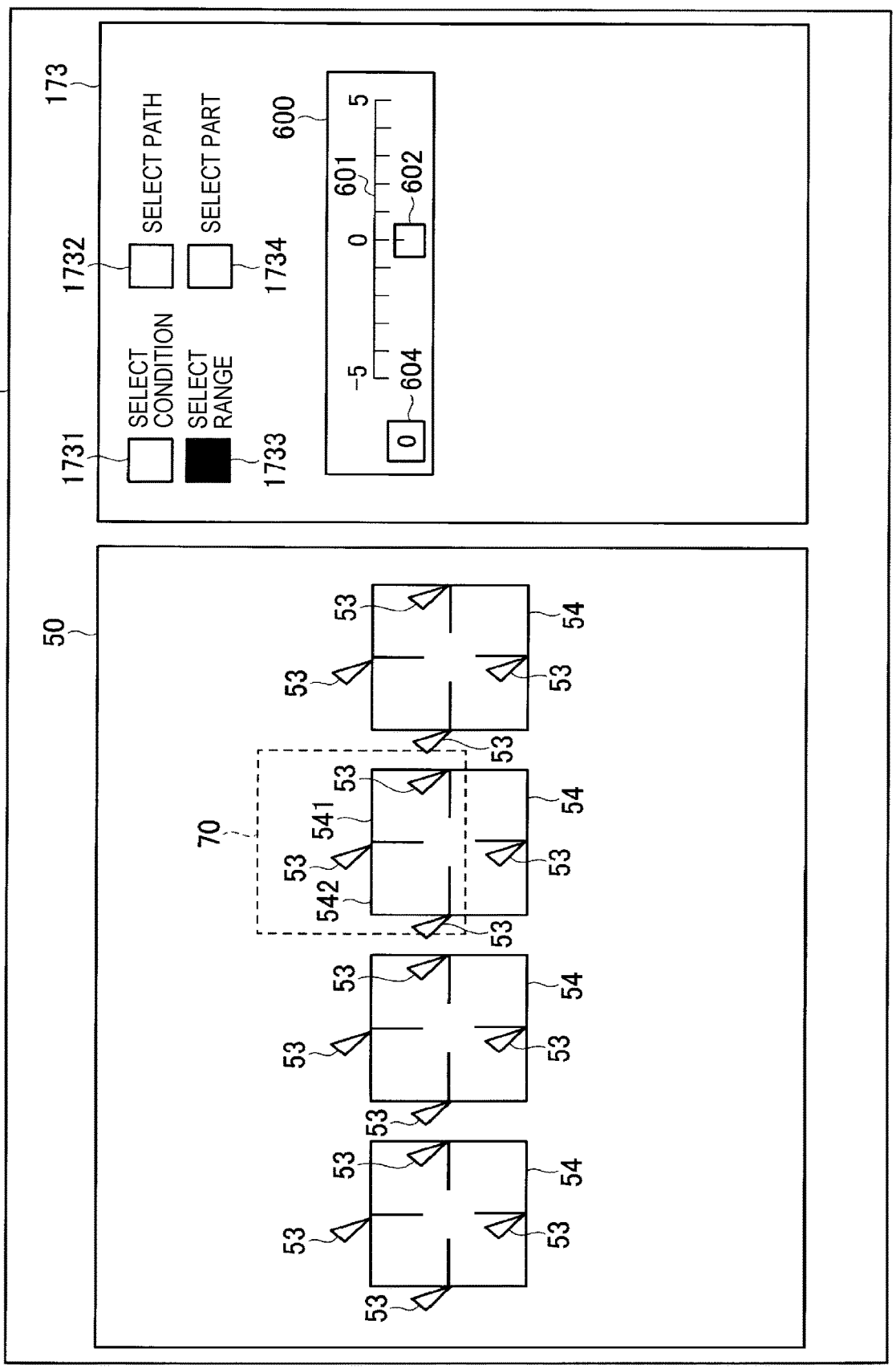
FIG. 22 is a view showing a state where a region including a cutting path to be compensated for the joint amount has been set by touching a selection button for range selection in the display image shown in FIG. 19.

FIG. 22 shows the window 173 in a state where the selection button 1733 for range selection has been touched. For example, it is assumed that the operator touches a finger on the touch panel 17 to set a region 70 including a cutting path to be compensated for the joint amount, as indicated by a rectangle of a broken line. In the example shown in FIG. 22, the region 70 includes two cutting paths 541, 542 in the upper right and upper left of the second part image 54 from the right.

Figure 23:
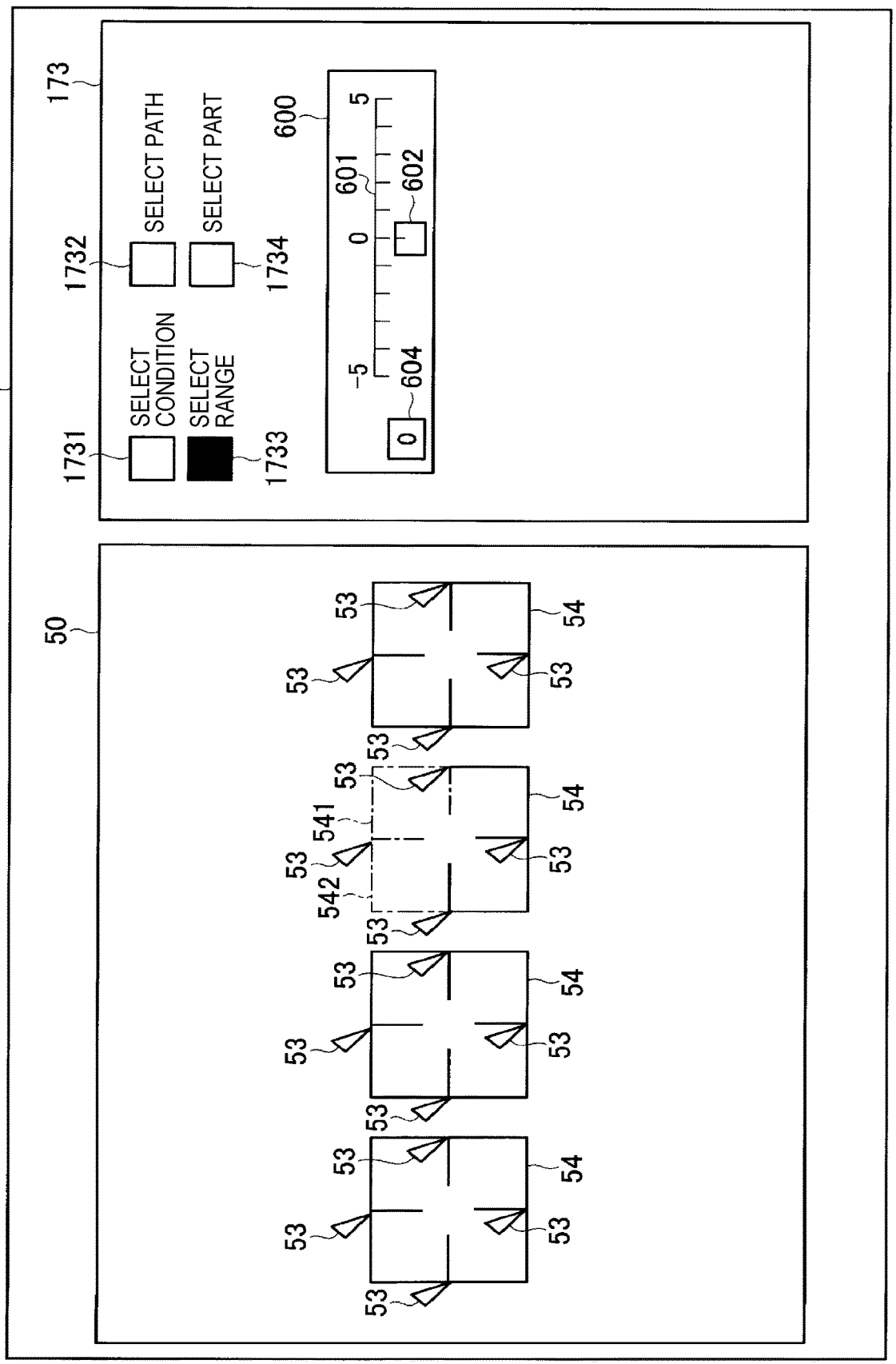
FIG. 23 is a view showing a state where a joint existing in a cutting path included in a region by the setting of the region shown in FIG. 22 has been set as the joint to be compensated for the joint amount.

As shown in FIG. 23, the display controller 16 changes the colors of the touched cutting paths 541, 542. In FIG. 23, the color-changed cutting paths 541, 542 are indicated by dashed and dotted lines. The central controller 11 sets joints existing in the color-changed cutting paths 541, 542 indicated by the dashed and dotted lines as the objects to be compensated for the joint amount. A joint amount compensation setting image 600 is displayed in the window 173.

When the operator moves the slider 602 in the joint amount compensation setting image 600 in the plus direction or the minus direction, the joint compensation amount generator 15 generates the joint compensation amounts of the joints existing in the color-changed cutting path 541, 542. The central controller 11 causes the storage 12 to store the joint compensation amount associated with the joint number. When the joint compensation amounts associated with the joint numbers are transmitted to the NC device 21 and stored into the joint compensation amount storage 26, the laser processing machine 20 compensates the joint amounts of the joints existing in the selected cutting paths 541, 542 by the joint compensation amounts stored in the joint compensation amount storage 26.

Although FIGS. 22 and 23 show a state where a plurality of cutting paths have been selected by surrounding a part of one part image 54 with the region 70, the operator may surround a plurality of parts 54 with the region 70 so as to include those parts or surround a plurality of part images 54 with the region 70 so as to straddle those parts.

Similarly, when the joint is set as the object to be compensated for the joint amount as shown in FIGS. 22 and 23, the NC device 21 may determine whether or not the joint compensation amount is stored in the joint compensation amount storage 26 in association with the joint number of the joint existing in one or more cutting paths to be cut in step S206 of FIG. 15.

Figure 24:
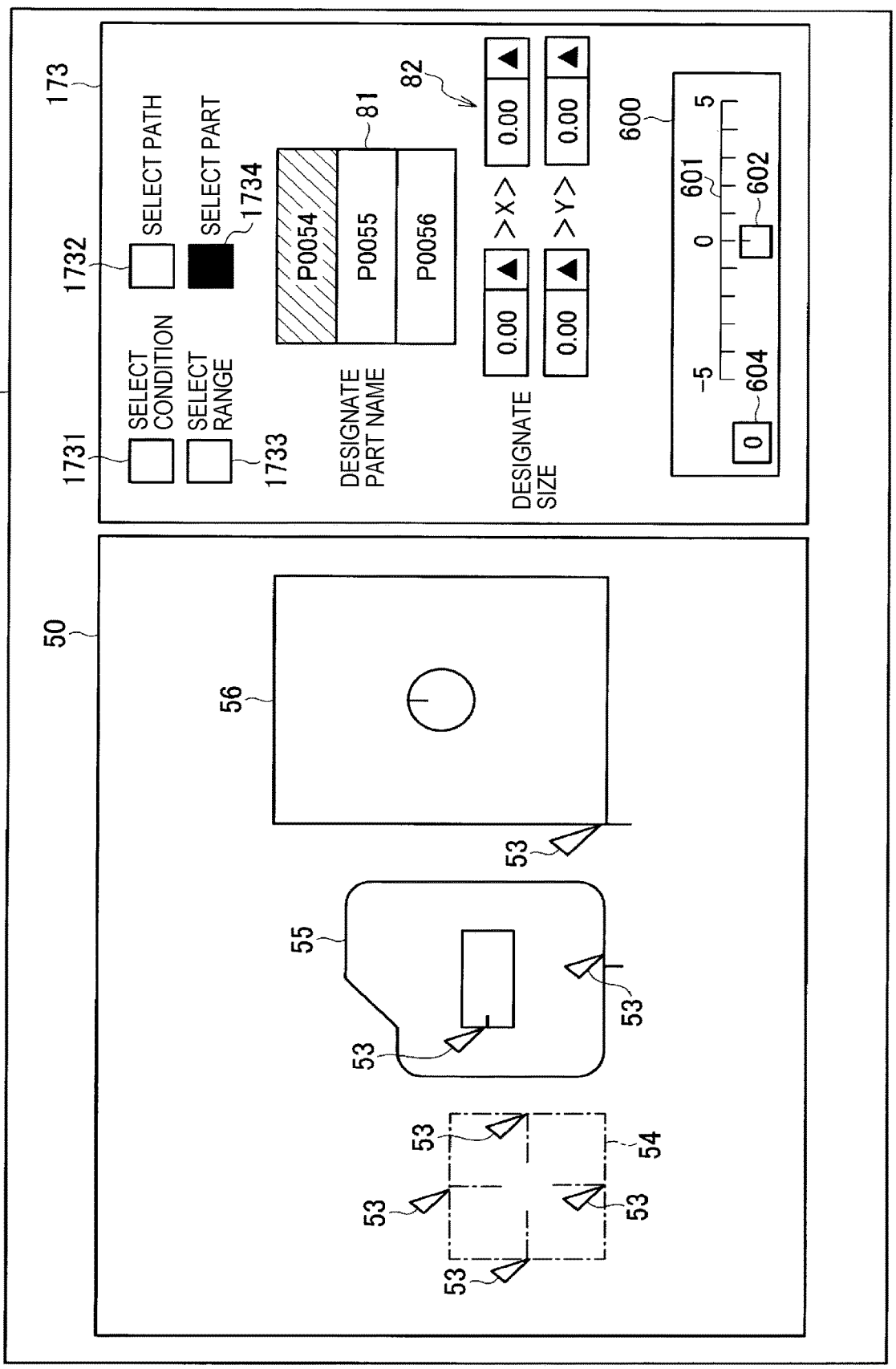
FIG. 24 is a view showing a state where one part has been selected by touching a selection button for part selection in the display image shown in FIG. 19, and a joint existing in the cutting path included in the selected part has been set as the joint to be compensated for the joint amount

FIG. 24 shows the window 173 in a state where the selection button 1734 for part selection has been touched. In the example shown in FIG. 24, part images 54 to 56 are arranged. The part image 55 has the same shape as the first part image 51 shown in FIG. 10. The part image 56 has the same shape as the second part image 52 shown in FIG. 10. It is assumed that the part names of the parts shown in the part images 54 to 56 are P0054, P0055, P0056, respectively.

The window 173 displays a part list 81 for selecting a part to be compensated for the joint amount, a size input section 82 for designating the size of the part to be compensated for the joint amount, and the joint amount compensation setting image 600. In the size input section 82, X is the size of the part in the X direction (horizontal direction in FIG. 24), and Y is the size of the part in the Y direction (vertical direction in FIG. 24).

As shown in FIG. 24, for example, when the operator selects the part name P0054 from the part list 81, the display controller 16 changes the colors of all cutting paths of the part image 54. In FIG. 24, the color-changed cutting paths are indicated by dashed and dotted lines. The central controller 11 sets the joints existing in all the color-changed cutting paths in the selected parts as the objects to be compensated for the joint amount.

When the operator moves the slider 602 in the joint amount compensation setting image 600 in the plus direction or the minus direction, the joint compensation amount generator 15 generates the joint compensation amounts of the joints existing in all the color-changed cutting paths. The central controller 11 causes the storage 12 to store the joint compensation amounts corresponding to the part names. When the joint compensation amounts associated with the part names are transmitted to the NC device 21 and stored into the joint compensation amount storage 26, the laser processing machine 20 compensates the joint amounts of the joints existing in all the cutting paths of the selected part by the joint compensation amounts stored in the joint compensation amount storage 26.

FIG. 24 shows a state where only one part (part image 54) has been selected by the part list 81, but the operator may select two or more parts. When the size of the part is designated by the size input section 82, one or two or more parts included in the designated range are set as the objects to be compensated for the joint amount.

As shown in FIG. 24, when all the joints provided in the part are set as the objects to be compensated for the joint amount, the NC device 21 may determine whether or not the joint compensation amount associated with the part to be cut is stored in the joint compensation amount storage 26 in step S206 of FIG. 15.

Second Configuration Example

The joint compensation amount generator 15 is not limited to generating a joint compensation amount by a predetermined operation by the operator but may generate the joint compensation amount by automatic control by the central controller 11 or the NC device 21.

Figure 25:
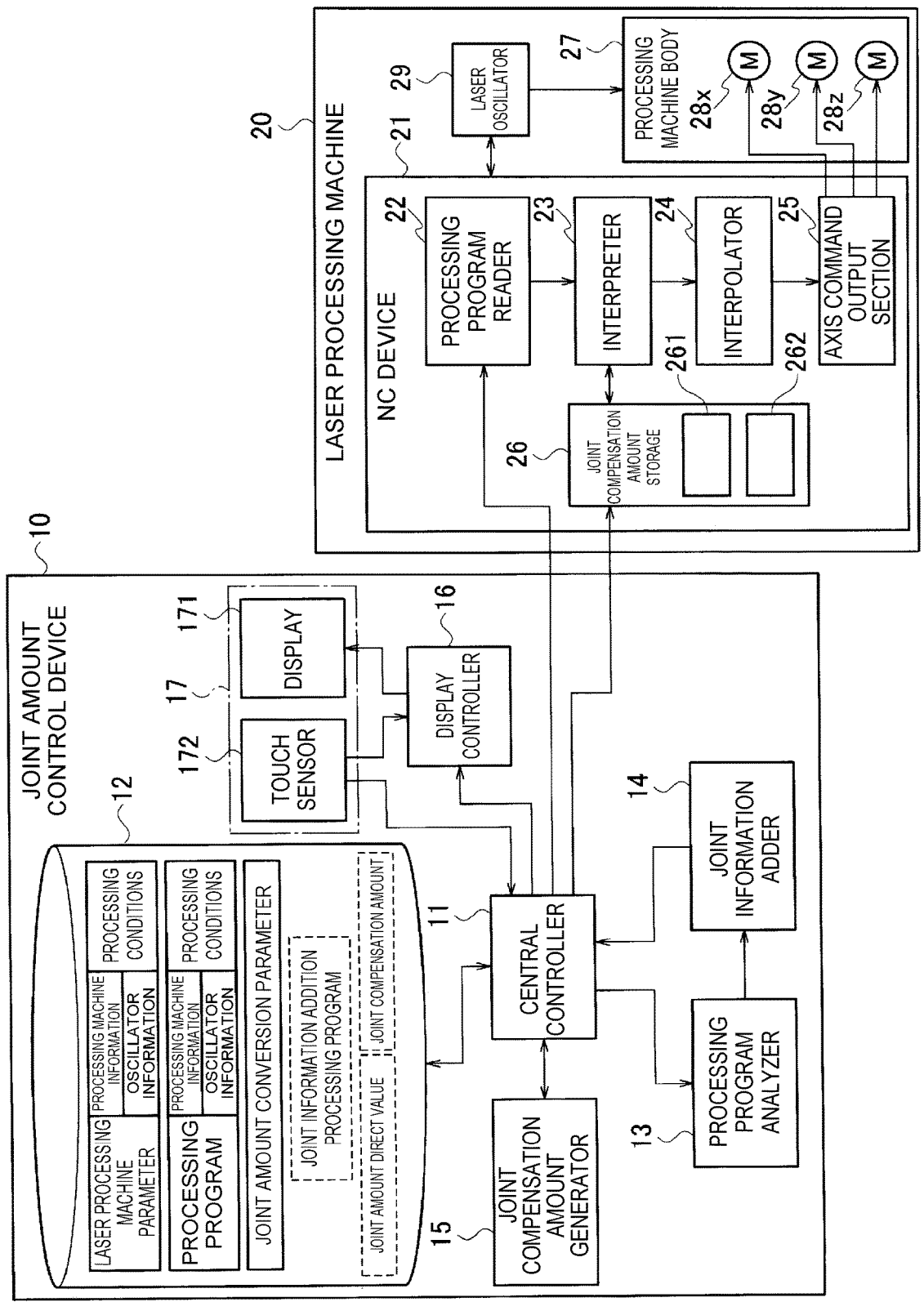
FIG. 25 is a block diagram showing a second configuration example of a joint amount control device and a laser processing machine according to one or more embodiments.

FIG. 25 shows a second configuration example in which the central controller 11 automatically generates a joint compensation amount and transmits the joint compensation amount to the NC device 21 when the NC device 21 reads a processing program. As described above, when a processing program created for a laser processing machine using a $CO_2$ laser oscillator is used in a laser processing machine using a fiber laser oscillator, a joint amount may become inappropriate. FIG. 25 shows a configuration suitable for cutting a sheet metal by using a processing program created for a laser processing machine using a first laser oscillator in a laser processing machine using a second laser oscillator.

The storage 12 stores the processing program created for the laser processing machine using the first laser oscillator. The first laser oscillator is, for example, a $CO_2$ laser oscillator. The processing program is accompanied by processing machine information indicating the model of the laser processing machine using the first laser oscillator, oscillator information indicating the type of the first laser oscillator, and processing conditions. The processing machine information, the oscillator information, and the processing conditions are referred to as accompanying information. The processing conditions include the material and thickness of a sheet metal to be processed, a processing velocity (cutting velocity), a tool radius compensation amount, and various other pieces of information.

It is assumed that the laser oscillator 29 provided in the laser processing machine 20, which is to cut the sheet metal by the processing program created for the laser processing machine using the first laser oscillator stored in the storage 12 is the second laser oscillator different from the first laser oscillator. The second laser oscillator is, for example, a fiber laser oscillator. The storage 12 previously stores, as parameters of the laser processing machine 20, processing machine information indicating the model of the laser processing machine 20, oscillator information indicating the type of the laser oscillator 29, and processing conditions selected for the laser processing machine 20 to cut the sheet metal. The operator can operate the touch panel 17 to select processing conditions corresponding to the material and thickness of the sheet metal to be cut.

A diameter (beam diameter) of a beam spot formed by a laser beam emitted from the $CO_2$ laser oscillator is larger than a beam diameter of a laser beam emitted from the fiber laser oscillator. Therefore, when the processing program created for the laser processing machine using the $CO_2$ laser oscillator is used for the laser processing machine using the laser oscillator 29 that is the fiber laser oscillator, the joint amount increases, and it becomes difficult to remove the part from the sheet metal. On the contrary, when a processing program created for the laser processing machine using the fiber laser oscillator is used for the laser processing machine using the $CO_2$ laser oscillator, the joint amount decreases, and the part falls from the sheet metal.

Therefore, when transmitting the joint information addition processing program to the NC device 21, the joint amount control device 10 may automatically generate a joint compensation amount for collectively compensating the joint amounts of all the joints and transmit the joint compensation amount to the NC device 21.

Figure 26:
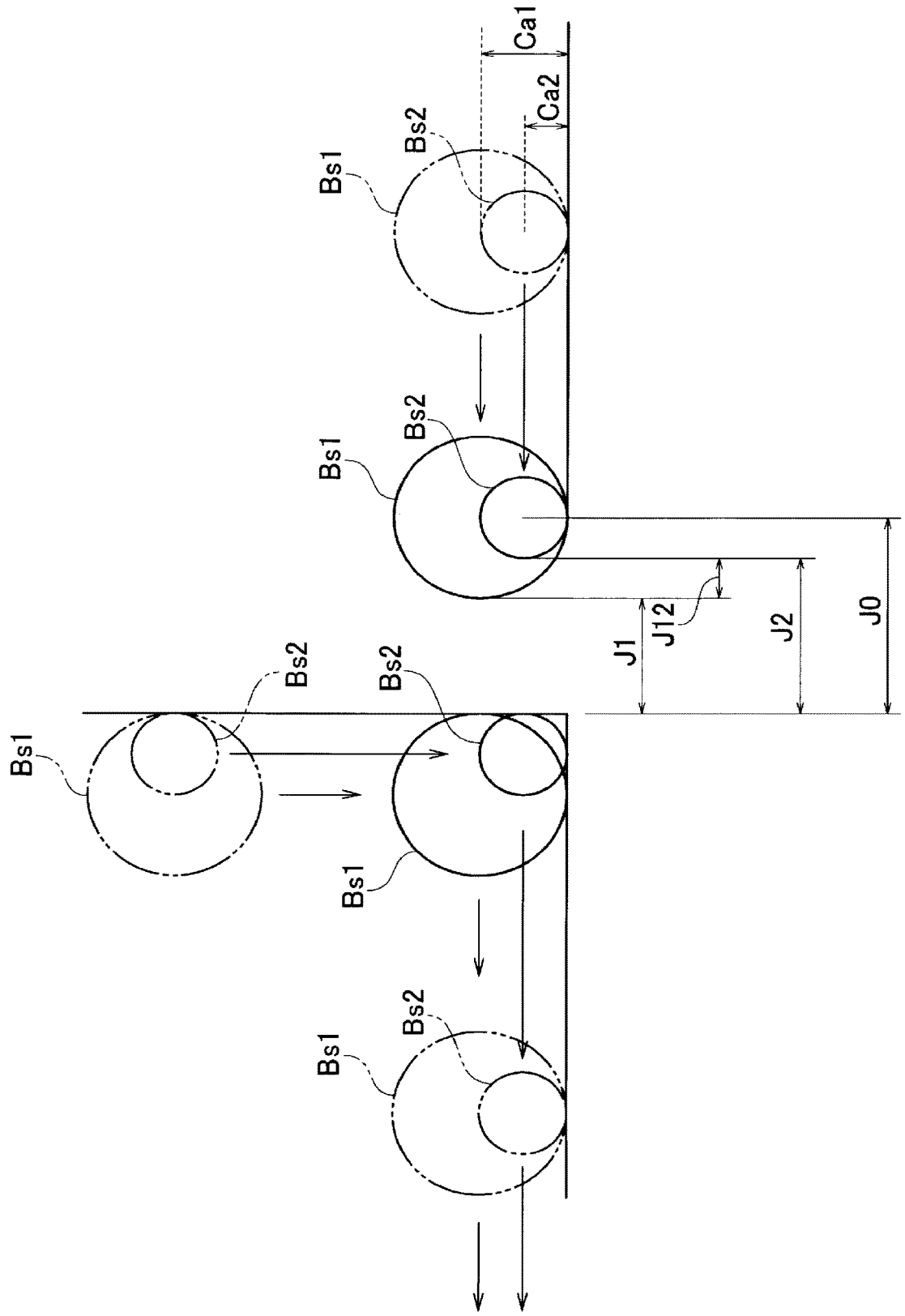
FIG. 26 is a view showing a joint compensation amount to be generated when the joint amount is inappropriate due to a difference in a beam diameter of a laser beam.

FIG. 26 shows how the joint amount changes when the sheet metal is cut by the laser processing machine using the fiber laser oscillator by using the processing program created for the laser processing machine using the $CO_2$ laser oscillator. In FIG. 26, a thick solid line indicates a cutting path set in the processing program. As shown in FIG. 26, there is a position gap between a beam spot Bs1 at the time when the laser processing machine using the $CO_2$ laser oscillator cuts the sheet metal and a beam spot Bs2 at the time when the laser processing machine using the fiber laser oscillator cuts the sheet metal.

A distance J0 is a joint amount set in the processing program. A distance J1 is a joint amount (hereinafter referred to as a joint amount J1) including the beam diameter of the beam spot Bs1 at the time when the laser processing machine using the $CO_2$ laser oscillator cuts the sheet metal. A distance J2 is a joint amount (hereinafter referred to as a joint amount J2) including the beam diameter of the beam spot Bs2 at the time when the laser processing machine using the fiber laser oscillator cuts the sheet metal. When the sheet metal is cut by the laser processing machine using the fiber laser oscillator by using the processing program created for the laser processing machine using the $CO_2$ laser oscillator, the joint amount increases by a distance J12 that is the difference between the joint amount J1 and the joint amount J2.

On the contrary, when the sheet metal is cut by the laser processing machine using the $CO_2$ laser oscillator by using the processing program created for the laser processing machine using the fiber laser oscillator, the joint amount decreases by the distance J12 that is the difference between the joint amount J1 and the joint amount. J2.

The joint compensation amount generator 15 can calculate the distance J12 corresponding to the joint compensation amount based on the tool radius compensation amount included in the processing conditions in the accompanying information of the processing program and the tool radius compensation amount included in the processing conditions in the parameters of the laser processing machine 20. As shown in FIG. 26, the tool radius compensation amount included in the processing conditions in the accompanying information of the processing program is a distance Ca1 (hereinafter referred to as a tool radius compensation amount Ca1) that is half the beam diameter of the beam spot Bs1. The tool radius compensation amount included in the processing conditions in the parameters of the laser processing machine 20 is a distance Ca2 (hereinafter referred to as a tool radius compensation amount Ca2) that is half the beam diameter of the beam spot Bs2. The distance J12 can be obtained by taking a difference between the tool radius compensation amount Ca1 and the tool radius compensation amount Ca2.

Note that the central controller 11 may control the joint compensation amount generator 15 so as to obtain a difference in the tool radius compensation amount in the processing conditions when the oscillator information in the accompanying information is different from the oscillator information in the parameters of the laser processing machine 20. The central controller 11 may control the joint compensation amount generator 15 so as to obtain the difference in the tool radius compensation amount in the processing conditions when the oscillator information is different between the accompanying information and the parameters of the laser processing machine 20, and further, the processing machine information is different therebetween. In this way, when it is necessary to generate a joint compensation amount for compensating the joint amounts of all the joints in a uniform and collective manner, a calculation for obtaining the difference in the tool radius compensation amount can be performed.

The central controller 11 may cause the joint compensation amount storage 26 to store joint compensation amounts associated with joint specifying information indicating that all the joints are joints to be compensated by any one of all E numbers, all the joint numbers, and all the part numbers.

Figure 27:
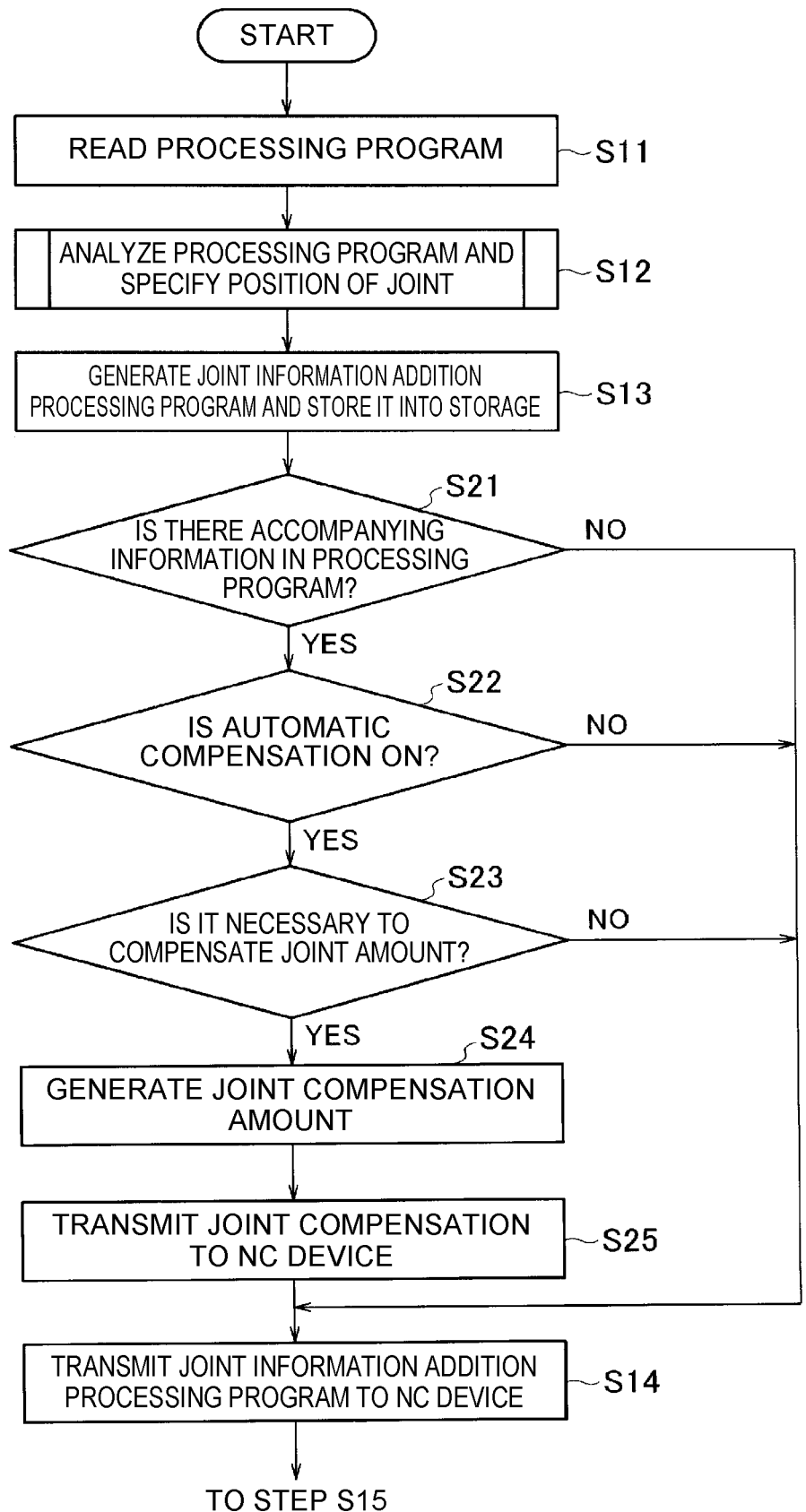
FIG. 27 is a flowchart showing a joint amount control method executed by the joint amount control device or partial processing executed by a joint amount control program in the second configuration example shown in FIG. 25.

With reference to FIG. 27, a description will be given of a joint amount control method executed by the joint amount control device 10 shown in FIG. 25 or processing of a joint amount control program executed by the CPU when the joint amount control device 10 is constituted using the computer equipment. In FIG. 27, the same processing as in FIG. 13 is denoted by the same symbol, and the description thereof is omitted.

In FIG. 27, following step S13, the central controller 11 determines in step S21 whether or not there is accompanying information in the processing program. When there is accompanying information in the processing program (YES), the central controller 11 moves the processing to step S22, and when there is no accompanying information (NO), the central controller 11 moves the processing to step S14. In step S22, the central controller determines whether or not a function of automatic compensation of a joint amount is on. Whether the function of automatic compensation is turned on or off can be set in the central controller 11 by the touch panel 17.

When the function of automatic compensation is on (YES) in step S22, the central controller 11 moves the processing to step S23, and when the function is off (NO), the central controller 11 moves the processing to step S14. In step S23, the central controller 11 determines whether or not it is necessary to compensate the joint amount. When it is necessary to compensate the joint amount (YES), the joint compensation amount generator 15 generates a joint compensation amount in step S24. As an example, when the tool radius compensation amount of the processing condition in the accompanying information of the processing program is 0.20 mm, and the tool radius compensation amount of the processing condition in the parameters of the laser processing machine 20 is 0.12 mm, the joint compensation amount can be calculated to be 0.08 mm.

In step S24, the central controller 11 causes the storage 12 to store the joint compensation amount and moves the processing to step S25. When it is not necessary to compensate the joint amount (NO) in step S23, the central controller 11 moves the processing to step S14. In step S25, the central controller 11 transmits the joint compensation amount to the NC device 21 and moves the processing to step S14 in FIG. 13.

When a predetermined joint compensation amount is generated in step S24, and the joint compensation amount is transmitted to the NC device 21 in step S25, a joint compensation amount for collectively compensating the joint amounts of all the joints is stored into the joint compensation amount storage 26. At this time, as shown in FIG. 25, the joint compensation amount storage 26 preferably stores the joint compensation amount, supplied when the NC device 21 reads the joint information addition processing program, into a first storage region 261.

According to the processing of steps S21 to S25 in FIG. 27, the joint compensation amount has already been stored in the joint compensation amount storage 26 at the point in time when the NC device 21 reads the joint information addition processing program before the start of the processing. Therefore, when the NC device 21 starts cutting the sheet metal in accordance with the joint information addition processing program, the joint amounts of all the joints during the processing are compensated.

After the joint amount control device 10 automatically generates the joint compensation amount and causes the joint compensation amount storage 26 to store the joint compensation amount, the operator may manually generate the joint compensation amount in steps S15 to S17. The operator may select the joint to be compensated by any of the methods shown in FIGS. 19 to 24 to generate the joint compensation amount. At this time, as shown in FIG. 25, the joint compensation amount storage 26 may store the joint compensation amount, generated by the operator's operation, into a second storage region 262.

When the joint compensation amount for collectively compensating the joint amounts of all the joints is stored in the first storage region 261, the interpreter 23 collectively compensates the joint amounts of all the joints by the joint compensation amounts stored in the first storage region 261. When the joint compensation amount is not stored in the first storage region 261, and the joint compensation amount is stored in the second storage region 262, the interpreter 23 compensates the joint amount of the joint specified by the joint specifying information by the joint compensation amount stored in the second storage region 262.

When the joint compensation amount is stored in both the first storage region 261 and the second storage region 262, the interpreter 23 compensates the joint amount as follows. The interpreter 23 collectively compensates the joint amounts of all the joints by the joint compensation amounts stored in the first storage region 261 and compensates the joint amount of the joint specified by the joint specifying information by the joint compensation amounts stored in the second storage region 262.

Third Configuration Example

In each of the first configuration example shown in FIG. 1 and the second configuration example shown in FIG. 25 described above, the operator sets the relative increased/decreased value for increasing or decreasing the joint amount by operating the slider 602 in the joint amount compensation setting image 60 or 600. The operator may set a direct value directly indicating a joint amount of a joint that is formed when the laser processing machine 20 cuts the sheet metal instead of the relative increased/decreased value.

A configuration in which the operator sets the direct value of the joint amount may be the same configuration as in the first configuration example shown in FIG. 1 or the second configuration example shown in FIG. 25. The operation of the joint amount control device 10 in a case where the direct value of the joint amount is set in the same configuration as in the second configuration example shown in FIG. 25 will be described.

As an example, it is assumed that the joint amount set in the processing program is 0.4 mm and that the operator designates the joint amount as 0.75 mm. At this time, the joint compensation amount generator 15 generates a joint compensation amount of 0.35 mm by subtracting 0.4 mm from 0.75 mm. The central controller 11 transmits the joint specifying information and the joint compensation amount to the NC device 21. It is also possible for the operator to designate the direct value of the joint amount for collectively designating the joint amounts of all the joints.

The reason why the direct value of the joint amount is converted into the joint compensation amount, which is the relative increased/decreased value for increasing or decreasing the joint amount, is that the interpreter 23 cannot compensate the joint amount based on the direct value of the joint amount, and the joint amount needs to be compensated based on the joint compensation amount.

Figure 28A:
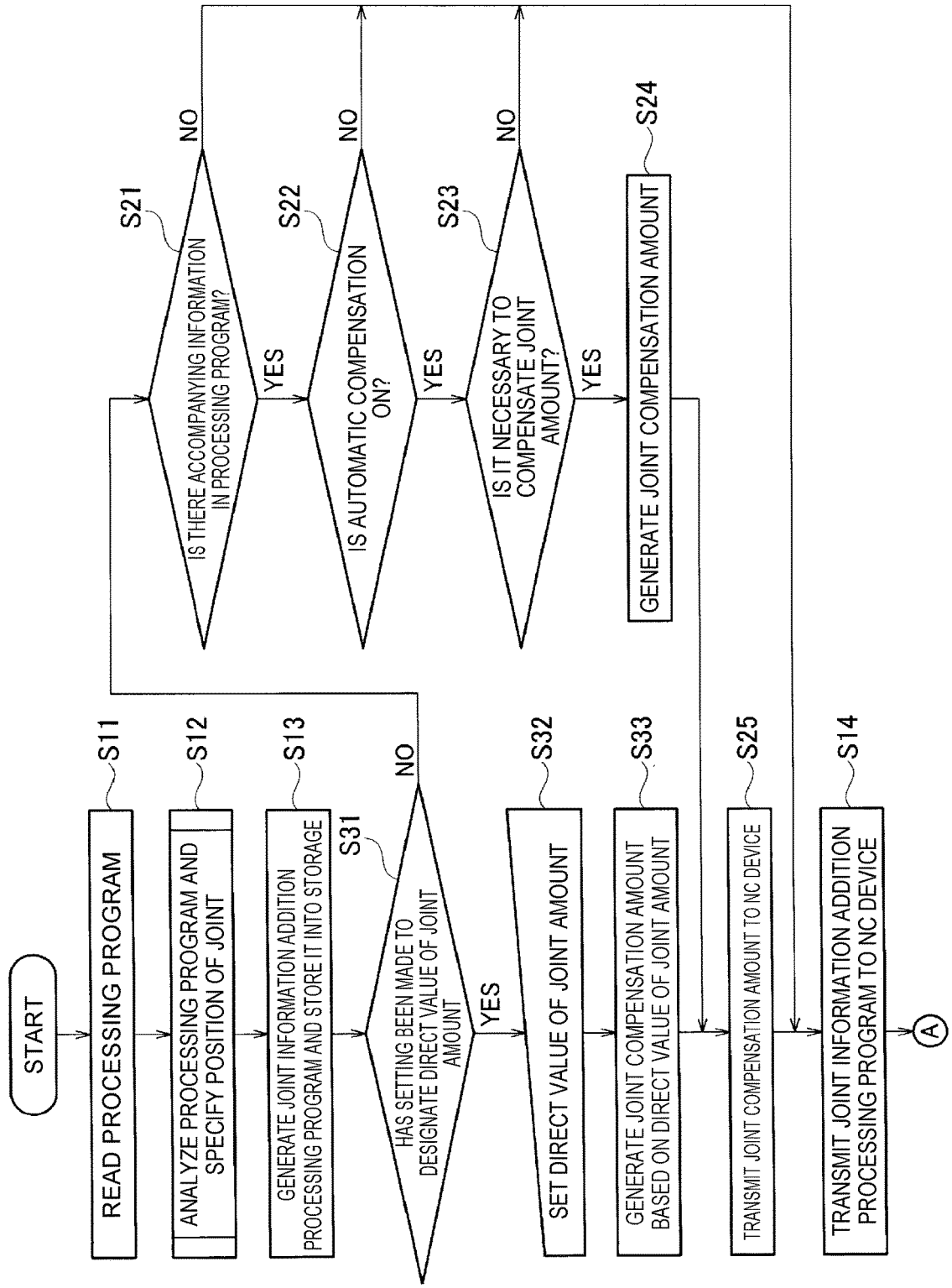
FIG. 28A is a flowchart showing a joint amount control method or partial processing executed by a joint amount control program executed in a third configuration example of the joint amount control device and the laser processing machine according to one or more embodiments.
Figure 28B:
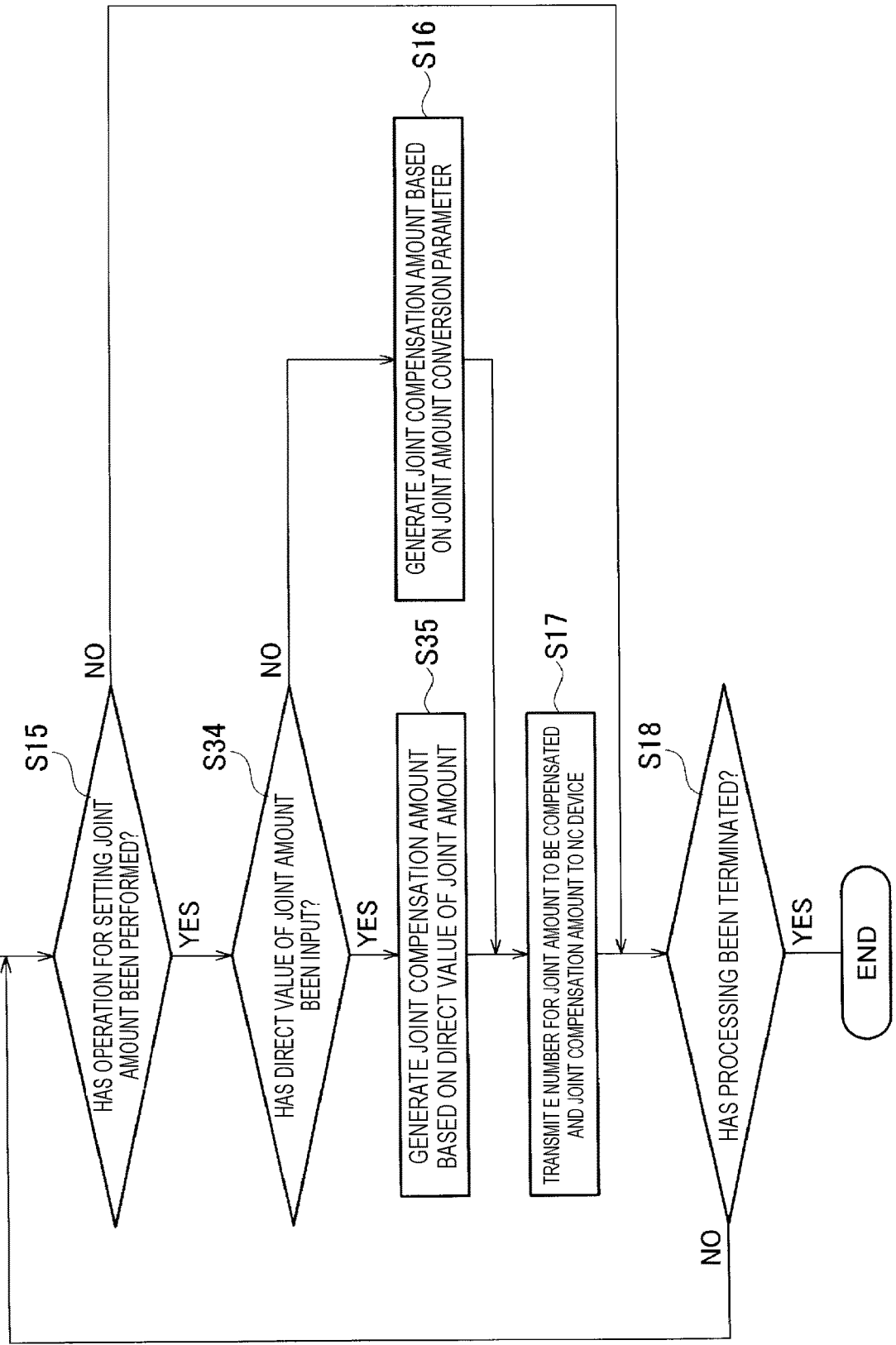
FIG. 28B is a flowchart showing partial processing following FIG. 28A.

With reference to FIGS. 28A and 28B, a description will be given of a joint amount control method executed by the joint amount control device 10 when the operator sets a direct value of a joint amount in the same configuration as in the second configuration example shown in FIG. 25, or processing of a joint amount control program executed by the CPU when the joint amount control device 10 is constituted using the computer equipment. In each of FIGS. 28A and 28B, the same processing as in FIG. 13 or 27 is denoted by the same symbol, and the description thereof is omitted.

In FIG. 28A, following step S13, the central controller 11 determines in step S31 whether or not a setting has been made to designate the direct value of the joint amount. When the setting has been made to designate the direct value of the joint amount (YES), the operator sets the direct value of the joint amount in step S32. The direct value of the joint amount is stored into the storage 12. In step S33, the joint compensation amount generator generates a joint compensation amount based on the direct value of the joint amount. In step S33, the central controller 11 causes the storage 12 to store the joint compensation amount and moves the processing to step S25.

When the setting has not been made to designate the direct value of the joint amount (NO) in step S31, the central controller 11 executes steps S21 to S24 and moves the processing to step S25, as in FIG. 27.

In step S25, the central controller 11 transmits the joint compensation amount generated in steps S32 and S33 or the joint compensation amount generated in step S24 to the NC device 21. The joint compensation amount generated in steps S32 and S33 is a joint compensation amount for collectively compensating the joint amounts of all the joints generated based on the direct value of the joint amount of the joint set by the operator. The joint compensation amount generated in step S24 is a joint compensation amount for collectively compensating the joint amounts of all the joints, which is generated not by the operator's operation but in an automatic manner. The joint compensation amount transmitted in step S25 is stored into the first storage region 261.

In step S14, the central controller 11 transmits the joint information addition processing program to the NC device 21 and moves the processing to step S15 in FIG. 28B.

In FIG. 28B, in step S15, the central controller 11 determines whether or not an operation for compensating the joint amount has been performed. When the operation for compensating the joint amount has not been performed (NO), the central controller 11 moves the processing to step S18. When the operation for compensating the joint amount has been performed (YES), the central controller 11 determines in step S34 whether or not the direct value of the joint amount has been input. When the direct value of the joint amount has not been input (NO), that is, when the relative increased/decreased value of the joint amount has been input, the joint compensation amount generator 15 generates a joint compensation amount based on the joint amount conversion parameter in step S16. In step S16, the central controller 11 causes the storage 12 to store the joint compensation amount and moves the processing to step S17.

When the direct value of the joint amount has been input (YES) in step S34, the joint compensation amount generator 15 generates a joint compensation amount based on the direct value of the joint amount in step S35. In step S35, the central controller 11 causes the storage 12 to store the joint compensation amount and moves the processing to step S17.

In step S17, the central controller 11 transmits the E number for the joint amount to be compensated and the joint compensation amount to the NC device 21. The joint for which the joint compensation amount is set may be designated by the E number, the joint number, or the part name, as described above. In step S18, the central controller 11 determines whether or not the processing has been terminated by the termination of the processing program. When the processing has not been terminated (NO), the processing of steps S15 to S18 is repeated. When the processing has been terminated in step S18 (YES), the central controller 11 terminates the joint amount compensation processing by the joint amount control device 10.

The present invention is not limited to one or more embodiments including the first to third embodiments described above, but various modifications can be made without departing from the gist of the present invention.

This application claims priority under Japanese Patent Application No. 2019-085013 filed with the Japan Patent Office on Apr. 26, 2019, the entire disclosure of which is hereby incorporated by reference.

The invention claimed is:

1. A joint amount control method comprising, by computer equipment:
analyzing a processing program for cutting a sheet metal by a laser processing machine to produce a part to extract a first code and a second code included in the processing program and indicating a joint-constituting pair of a first endpoint of a cutting path on a laser cutting start side and a second endpoint of a cutting path on a laser cutting end side;
adding joint information indicating a position of at least one of the extracted first code and second code to the processing program;
transmitting, to a numerical control (NC) device, the processing program to which the joint information is added so that the NC device cuts the sheet metal by controlling the laser processing machine based on the processing program so as to produce a part provided with the joint;
generating a joint compensation amount to be set for a joint to be increased or decreased in a joint amount, among joints provided in the part produced based on the processing program; and
transmitting, to the NC device, the joint compensation amount associated with information indicating a joint to be increased or decreased in the joint amount so that the joint amount of the joint to be increased or decreased in the joint amount is increased or decreased by the joint compensation amount at a time of the laser processing machine producing the part;
wherein the analyzing the processing program comprises:
extracting at least one cutting start point including at least a cutting start point of a cutting path leading to an approach from a laser cutting start point at which a pierced hole is made on the laser cutting start side, and at least two cutting end points including a laser cutting end point and a cutting end point of at least one cutting path leading to a cutting path toward the laser cutting end point in a direction opposite to a cutting advancing direction on the laser cutting end side, based on a plurality of cutting paths following each code of all of codes indicating a start of cutting and a plurality of cutting paths immediately before each code of all of codes indicating an end of cutting included in the processing program;
calculating distances of all combinations of all of the extracted at least one cutting start point and all of the extracted at least two cutting end points;
extracting pairs of the cutting start point and the cutting end point whose calculated distance is within a range of a predetermined distance as joint candidates, which are candidates for the joint-constituting pair;
extending the cutting path from the cutting start point of each joint candidate in the direction opposite to the cutting advancing direction to form a first extended line, and extending the cutting path toward the cutting end point of each joint candidate in the cutting advancing direction to form a second extended line;
determining that a joint candidate among the extracted joint candidates is the joint-constituting pair when the second extended line collides with the cutting start point or the first extended line and the second extended line intersect with each other, a distance between the joint-constituting pair being the joint amount;
setting the cutting start point determined to be the cutting start point of the joint-constituting pair as the first endpoint of the cutting path on the laser cutting start side, and setting the cutting end point determined to be the cutting end point of the joint-constituting pair as the second endpoint of the cutting path on the laser cutting end side; and
extracting the first code and the second code indicating the joint-constituting pair of the first endpoint and the second endpoint.

2. The joint amount control method according to claim 1, wherein the computer equipment generates the joint compensation amount in response to an operation of setting one or more joints among the joints provided in the part as the joint to be increased or decreased in the joint amount.

3. The joint amount control method according to claim 2, wherein the computer equipment specifies the joint to be increased or decreased in the joint amount by one of a processing condition number indicating a processing condition selected at a time of the laser processing machine cutting the sheet metal, a joint number assigned to the joint provided in the part, and a part number of the part.

4. The joint amount control method according to claim 1, wherein the computer equipment sets all joints provided in the part as joints to be increased or decreased in the joint amount and generates a uniform joint compensation amount for all the joints provided in the part.

5. The joint amount control method according to claim 4, wherein
the processing program is a processing program created for a laser processing machine configured to cut a sheet metal with a tool radius being compensated by a first tool radius compensation amount, and the laser processing machine controlled by the NC device is a laser processing machine configured to cut a sheet metal with a tool radius being compensated by a second tool radius compensation amount different from the first tool radius compensation amount,
the computer equipment generates a uniform joint compensation amount based on a difference between the first tool radius compensation amount and the second tool radius compensation amount for all the joints provided in the part.

6. A non-transitory computer readable medium having stored thereon a joint amount control program causing computer equipment to execute:
analyzing a processing program for cutting a sheet metal by a laser processing machine to produce a part and configured to extract a first code and a second code included in the processing program and indicating a joint-constituting pair of a first endpoint of a cutting path on a laser cutting start side and a second endpoint of a cutting path on a laser cutting end side;

adding joint information indicating a position of at least one of the extracted first code and second code to the processing program;

transmitting, to a numerical control (NC) device, the processing program to which the joint information is added so that the NC device cuts the sheet metal by controlling the laser processing machine based on the processing program so as to produce a part provided with the joint;

generating a joint compensation amount to be set for a joint to be increased or decreased in a joint amount, among joints provided in the part produced based on the processing program; and transmitting, to the NC device, the joint compensation amount associated with information indicating a joint to be increased or decreased in the joint amount so that the joint amount of the joint to be increased or decreased in the joint amount is increased or decreased by the joint compensation amount at a time of the laser processing machine producing the part;

wherein the joint amount control program causes the computer equipment to execute as the analyzing the processing program:

extracting at least one cutting start point including at least a cutting start point of a cutting path leading to an approach from a laser cutting start point at which a pierced hole is made on the laser cutting start side, and at least two cutting end points including a laser cutting end point and a cutting end point of at least one cutting path leading to a cutting path toward the laser cutting end point in a direction opposite to a cutting advancing direction on the laser cutting end side, based on a plurality of cutting paths following each code of all of codes indicating a start of cutting and a plurality of cutting paths immediately before each code of all of codes indicating an end of cutting included in the processing program;

calculating distances of all combinations of all of the extracted at least one cutting start point and all of the extracted at least two cutting end points;

extracting pairs of the cutting start point and the cutting end point whose calculated distance is within a range of a predetermined distance as joint candidates, which are candidates for the joint-constituting pair;

extending the cutting path from the cutting start point of each joint candidate in the direction opposite to the cutting advancing direction to form a first extended line, and extending the cutting path toward the cutting end point of each joint candidate in the cutting advancing direction to form a second extended line;

determining that a joint candidate among the extracted joint candidates is the joint-constituting pair when the second extended line collides with the cutting start point or the first extended line and the second extended line intersect with each other, a distance between the joint-constituting pair being the joint amount;

setting the cutting start point determined to be the cutting start point of the joint-constituting pair as the first endpoint of the cutting path on the laser cutting start side, and setting the cutting end point determined to be the cutting end point of the joint-constituting pair as the second endpoint of the cutting path on the laser cutting end side; and extracting the first code and the second code indicating the joint-constituting pair of the first endpoint and the second endpoint.

7. Computer equipment functioning as a joint amount control device, the computer equipment configured to:

analyze a processing program for cutting a sheet metal by a laser processing machine to produce a part and configured to extract a first code and a second code included in the processing program and indicating a joint-constituting pair of a first endpoint of a cutting path on a laser cutting start side and a second endpoint of a cutting path on a laser cutting end side:

add, to the processing program, joint information indicating a position of at least one of the first code and the second code extracted by the processing program analyzer;

generate a joint compensation amount to be set for a joint to be increased or decreased in a joint amount, among joints provided in the part produced based on the processing program;

transmit, to a numerical control (NC) device configured to control the laser processing machine, the processing program to which the joint information is added so that the NC device cuts the sheet metal so as to produce a part provided with the joint based on the processing program and increases or decreases the joint amount of the joint to be increased or decreased in the joint amount by the joint compensation amount, and the joint compensation amount associated with information indicating the joint to be increased or decreased in the joint amount;

extract at least one cutting start point including at least a cutting start point of a cutting path leading to an approach from a laser cutting start point at which a pierced hole is made on the laser cutting start side, and at least two cutting end points including a laser cutting end point and a cutting end point of at least one cutting path leading to a cutting path toward the laser cutting end point in a direction opposite to a cutting advancing direction on the laser cutting end side, based on a plurality of cutting paths following each code of all of codes indicating a start of cutting and a plurality of cutting paths immediately before each code of all of codes indicating an end of cutting included in the processing program:

calculate distances of all combinations of all of the extracted at least one cutting start point and all of the extracted at least two cutting end points;

extract pairs of the cutting start point and the cutting end point whose calculated distance is within a range of a predetermined distance as joint candidates, which are candidates for the joint-constituting pair:

extend the cutting path from the cutting start point of each joint candidate in the direction opposite to the cutting advancing direction to form a first extended line, and extends the cutting path toward the cutting end point of each joint candidate in the cutting advancing direction to form a second extended line;

determine that a joint candidate among the extracted joint candidates is the joint-constituting pair when the second extended line collides with the cutting start point or the first extended line and the second extended line intersect with each other, a distance between the joint-constituting pair being the joint amount;

set the cutting start point determined to be the cutting start point of the joint-constituting pair as the first endpoint of the cutting path on the laser cutting start side, and to set the cutting end point determined to be the cutting end point of the joint-constituting pair as the second endpoint of the cutting path on the laser cutting end side;

extract the first code and the second code indicating the joint-constituting pair of the first endpoint and the second endpoint;

extract three cutting start points of each of the three cutting paths leading to the approach, and three cutting end points including the laser cutting end point and two cutting end points of each of the two cutting paths leading to the cutting path toward the laser cutting end point in the direction opposite to the cutting advancing direction, calculate distances of all combinations of all of the extracted three cutting start points and all of the extracted three cutting end points; and extract pairs of the cutting start point and the cutting end point whose calculated distance is within the range of the predetermined distance as joint candidates, which are candidates for the joint-constituting pair.

8. The joint amount control method according to claim 1, wherein the analyzing the processing program comprises:

extracting three cutting start points of each of the three cutting paths leading to the approach, and three cutting end points including the laser cutting end point and two cutting end points of each of the two cutting paths leading to the cutting path toward the laser cutting end point in the direction opposite to the cutting advancing direction;

calculating distances of all combinations of all of the extracted three cutting start points and all of the extracted three cutting end points; and extracting pairs of the cutting start point and the cutting end point whose calculated distance is within the range of the predetermined distance as joint candidates, which are candidates for the joint-constituting pair.

* * * * *